(12) United States Patent
Henrich et al.

(10) Patent No.: US 12,502,354 B2
(45) Date of Patent: Dec. 23, 2025

(54) HIGH DENSITY LIPOPROTEIN MIMETIC NANOPARTICLES USING LIPID CONJUGATED CORE SCAFFOLDS

(71) Applicant: Northwestern University, Evanston, IL (US)

(72) Inventors: Stephen E. Henrich, Chicago, IL (US); C. Shad Thaxton, Chicago, IL (US); Sonbinh T. Nguyen, Evanston, IL (US); Bong Jin Hong, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 817 days.

(21) Appl. No.: 17/425,401

(22) PCT Filed: Jan. 24, 2020

(86) PCT No.: PCT/US2020/015109
§ 371 (c)(1),
(2) Date: Jul. 23, 2021

(87) PCT Pub. No.: WO2020/154705
PCT Pub. Date: Jul. 30, 2020

(65) Prior Publication Data
US 2022/0151928 A1    May 19, 2022

Related U.S. Application Data

(60) Provisional application No. 62/796,534, filed on Jan. 24, 2019.

(51) Int. Cl.
*A61K 9/1275* (2025.01)
*A61K 31/713* (2006.01)
*A61K 47/54* (2017.01)

(52) U.S. Cl.
CPC .......... *A61K 9/1275* (2013.01); *A61K 31/713* (2013.01); *A61K 47/54* (2017.08); *A61K 47/544* (2017.08)

(58) Field of Classification Search
CPC .... A61K 9/1275; A61K 31/713; A61K 47/54; A61K 47/544; A61K 9/0014; A61K 9/0019; A61K 9/0053; A61K 9/006; A61K 9/06; A61K 9/08; A61K 9/10; A61K 9/12; A61K 9/122; A61K 9/1605; A61K 9/2004; A61K 9/5123; A61K 9/7023; A61K 47/6917; A61K 9/127; A61K 9/2013; A61K 9/5169; A61K 31/655; A61K 47/6909; A61P 35/00; B82Y 5/00; C07K 14/775; C07K 17/02; C07K 14/003; C07K 19/00
See application file for complete search history.

(56) References Cited

U.S. PATENT DOCUMENTS

| | | |
|---|---|---|
| 6,361,944 B1 | 3/2002 | Mirkin et al. |
| 6,506,564 B1 | 1/2003 | Mirkin et al. |
| 8,323,686 B2 | 12/2012 | Mirkin et al. |
| 8,507,200 B2 | 8/2013 | Mirkin et al. |
| 9,216,155 B2 | 12/2015 | Thaxton et al. |
| 9,532,948 B2 | 1/2017 | Mirkin et al. |
| 10,078,092 B2 | 9/2018 | Mutharasan et al. |
| 10,328,026 B2 | 6/2019 | Thaxton et al. |
| 10,413,565 B2 | 9/2019 | Plebanek et al. |
| 10,517,927 B2 | 12/2019 | Thaxton et al. |
| 10,568,898 B2 | 2/2020 | Thaxton et al. |
| 10,967,072 B2 | 4/2021 | Thaxton et al. |
| 11,285,106 B2 | 3/2022 | Thaxton et al. |
| 2008/0306016 A1 | 12/2008 | Mirkin et al. |
| 2011/0059156 A9 | 3/2011 | Mirkin et al. |
| 2011/0111974 A1 | 5/2011 | Mirkin et al. |
| 2012/0244230 A1 | 9/2012 | Mirkin et al. |
| 2013/0034599 A1 | 2/2013 | Thaxton et al. |
| 2013/0195759 A1 | 8/2013 | Mirkin et al. |
| 2014/0134658 A1 | 5/2014 | Ahrens et al. |
| 2014/0294927 A1 | 10/2014 | Thaxton et al. |
| 2015/0064255 A1 | 3/2015 | Thaxton et al. |
| 2016/0184226 A1 | 6/2016 | Thaxton et al. |
| 2016/0193361 A1 | 7/2016 | Thaxton et al. |
| 2016/0274134 A1 | 9/2016 | Mutharasan et al. |
| 2017/0087094 A1 | 3/2017 | Plebanek et al. |
| 2017/0312365 A1 | 11/2017 | Thaxton et al. |
| 2017/0354711 A1 | 12/2017 | Thaxton et al. |
| 2018/0074080 A1 | 3/2018 | Thaxton et al. |
| 2019/0079105 A1 | 3/2019 | Mutharasan et al. |

(Continued)

FOREIGN PATENT DOCUMENTS

| | | |
|---|---|---|
| JP | H06-500795 A | 1/1994 |
| WO | WO 2006/138145 A1 | 12/2006 |

(Continued)

OTHER PUBLICATIONS

International Search Report and Written Opinion for International Application No. PCT/US2020/015109 mailed Apr. 16, 2020.

(Continued)

*Primary Examiner* — Robert S Cabral
(74) *Attorney, Agent, or Firm* — MARSHALL, GERSTEIN & BORUN LLP

(57) ABSTRACT

Disclosed herein are spherical high-density lipoprotein-like nanoparticles (HDL-NP) having a soft material core (e.g., a lipid-conjugated inorganic core). Also disclosed herein are methods for synthesizing the spherical HDL-NPs. Also disclosed herein are methods for treating disorders such as cardiovascular disease, cancer, inflammatory disorders or reducing NF-kB activity with the spherical HDL-NPs.

17 Claims, 20 Drawing Sheets
Specification includes a Sequence Listing.

(56) References Cited

U.S. PATENT DOCUMENTS

| | | |
|---|---|---|
| 2019/0365648 A1 | 12/2019 | Thaxton et al. |
| 2020/0281962 A1 | 9/2020 | Rink et al. |
| 2020/0330655 A1 | 10/2020 | Thaxton et al. |
| 2020/0363437 A1 | 11/2020 | Thaxton et al. |
| 2021/0244826 A1 | 8/2021 | Thaxton et al. |
| 2021/0332404 A1 | 10/2021 | Thaxton et al. |

FOREIGN PATENT DOCUMENTS

| | | |
|---|---|---|
| WO | WO 2008/127789 A2 | 10/2008 |
| WO | WO 2011/017456 A2 | 2/2011 |
| WO | WO 2011/053940 A2 | 5/2011 |
| WO | WO 2011/079290 A1 | 6/2011 |
| WO | WO 2013/033513 A1 | 3/2013 |
| WO | WO 2015/168393 A1 | 11/2015 |
| WO | WO 2016/106328 A1 | 6/2016 |
| WO | WO 2017/106690 A1 | 6/2017 |
| WO | WO 2018/053368 A1 | 3/2018 |
| WO | WO 2020/219833 A1 | 10/2020 |
| WO | WO 2020/231860 A1 | 11/2020 |
| WO | WO 2021/055788 A1 | 3/2021 |
| WO | WO 2021/236614 A1 | 11/2021 |
| WO | WO 2022/076324 A1 | 4/2022 |
| WO | WO 2022/087452 A1 | 4/2022 |

OTHER PUBLICATIONS

International Preliminary Report on Patentability for International Application No. PCT/US2020/015109 mailed Aug. 5, 2021.

Bitounis et al., Optimizing Druggability through Liposomal Formulations: New Approaches to an Old Concept. ISRN Pharm. 2012;2012:738432. doi: 10.5402/2012/738432. Epub Feb. 9, 2012.

Corbin et al., Near-infrared fluorescent imaging of metastatic ovarian cancer using folate receptor-targeted high-density lipoprotein nanocarriers. Nanomedicine (Lond). Jun. 2013;8(6):875-90. doi: 10.2217/nnm.12.137. Epub Oct. 15, 2012.

Dua et al., Liposome: Methods of Preparation and Applications. (IJPSR (2012) 3(2):14-20):.

Feig et al., HDL promotes rapid atherosclerosis regression in mice and alters inflammatory properties of plaque monocyte-derived cells. Proc Natl Acad Sci U S A. Apr. 26, 2011;108(17):7166-71. doi: 10.1073/pnas.1016086108. Epub Apr. 11, 2011. Erratum in: Proc Natl Acad Sci U S A. Aug. 23, 2011;108(34):14371.

Henrich et al., Supramolecular Assembly of High-Density Lipoprotein Mimetic Nanoparticles Using Lipid-Conjugated Core Scaffolds. J Am Chem Soc. Jun. 26, 2019;141(25):9753-9757. doi: 10.1021/jacs.9b00651. Epub Jun. 13, 2019.

Lacko et al., HDL as a drug and nucleic acid delivery vehicle. Front Pharmacol. Oct. 26, 2015;6:247. doi: 10.3389/fphar.2015.00247.

Liu, J. et al., Silica Nanoparticle Supported Lipid Bilayers for Gene Delivery, Chem. Commun., 2009, 5100-5102.

Lu et al., Biofunctional Polymer-Lipid Hybrid High-Density Lipoprotein-Mimicking Nanoparticles Loading Anti-miR155 for Combined Antiatherogenic Effects on Macrophages. Biomacromolecules. Aug. 14, 2017;18(8):2286-2295. doi: 10.1021/acs.biomac.7b00436. Epub Aug. 3, 2017.

Luthi et al., Nanotechnology for synthetic high-density lipoproteins. Trens Mol Med. Dec. 2010;16(12):553-60. doi: 10.1016/j.molmed.2010.10.006. Epub Nov. 17, 2010.

Luthi et al., Robust passive and active efflux of cellular cholesterol to a designer functional mimic of high density lipoprotein. J Lipid Res. May 2015;56(5):972-85. doi: 10.1194/jlr.M054635. Epub Feb. 4, 2015.

Marrache et al., Biodegradable synthetic high-density lipoprotein nanoparticles for atherosclerosis. Proc Natl Acad Sci U S A. Jun. 4, 2013;110(23):9445-50. doi: 10.1073/pnas.1301929110. Epub May 13, 2013.

McMahon et al., Biomimetic high density lipoprotein nanoparticles for nucleic acid delivery. Nano Lett. Mar. 9, 2011;11(3):1208-14. doi: 10.1021/nl1041947. Epub Feb. 14, 2011.

Palekar et al., Nanoparticle-based biosensors for the detection of lecithin: cholesterol acyltransferase activity. The Faseb J. Apr. 2017;31(1).

Plebanek et al., Nanoparticle Targeting and Cholesterol Flux Through Scavenger Receptor Type B-1 Inhibits Cellular Exosome Uptake. Sci Rep. Oct. 29, 2015;5:15724. doi: 10.1038/srep15724.

Sanchez-Gaytan et al., HDL-mimetic PLGA nanoparticle to target atherosclerosis plaque macrophages. Bioconjug Chem. Mar. 18, 2015;26(3):443-51. doi: 10.1021/bc500517k. Epub Feb. 13, 2015.

Thaxton et al., Templated Spherical High Density Lipoprotein Nanoparticles. J. Am. Chem. Soc., 2009, 131 (4), 1384-1385.

Yadav et al., Liposomes for drug delivery. J Biotechnol Biomater. 2017;7:4.

Yildirim et al., Hydrophobic organic linkers in the self-assembly of small molecule-DNA hybrid dimers: a computational-experimental study of the role of linkage direction in product distributions and stabilities. J Phys Chem B. Mar. 6, 2014;118(9):2366-76. doi: 10.1021/jp501041m. Epub Feb. 21, 2014.

Zhao et al., Multifunctional Dextran Sulfate-Coated Reconstituted High Density Lipoproteins Target Macrophages and Promote Beneficial Antiatherosclerotic Mechanisms. Bioconjugate Chemistry, 2017, 28, p. 438-448.

Japanese Patent Application No. 2021-542150, Notice of Reasons for Refusal, dated Nov. 16, 2023.

U.S. Appl. No. 17/703,824, filed Mar. 24, 2022, Thaxton et al.
U.S. Appl. No. 16/063,546, filed Jun. 18, 2018, Rink et al.
U.S. Appl. No. 16/083,465, filed Sep. 7, 2018, Thaxton et al.
U.S. Appl. No. 17/221,867, filed Apr. 5, 2021, Thaxton et al.
U.S. Appl. No. 16/917,395, filed Jun. 30, 2020, Thaxton et al.
U.S. Appl. No. 16/625,340, filed Dec. 20, 2019, Thaxton et al.
U.S. Appl. No. 17/605,510, filed Oct. 21, 2021, Thaxton et al.
U.S. Appl. No. 17/610,015, filed Nov. 9, 2021, Thaxton et al.
U.S. Appl. No. 17/760,990, filed Mar. 16, 2022, Thaxton et al.
PCT/US2020/015109, Apr. 16, 2020, International Search Report and Written Opinion.
PCT/US2020/015109, Aug. 5, 2021, International Preliminary Report on Patentability.

DPPC

DBCO PL

SM-Az$_4$

— 3'- TCC AGC CGA - 5'- phospholipid
— 3'- TCG GCT GGA - 5'- small molecule

*tetrakis*(4-azidophenyl)methane
(SM-AZ$_4$)
MW = 484 g/mol 1,2-dipalmitoyl-sn-glycero-3-phosphoethanolamine-N-dibenzocyclooctyl
(DBCO PL)
MW = 996 g/mol

SEQUENCE LISTING

<160> NUMBER OF SEQ ID NOS: 2

<210> SEQ ID NO 1
<211> LENGTH: 18
<212> TYPE: DNA
<213> ORGANISM: Artificial Sequence
<220> FEATURE:
<223> OTHER INFORMATION: Synthetic Polynucleotide

<400> SEQUENCE: 1
ttgttaatat gagtcgtt                                          18

<210> SEQ ID NO 2
<211> LENGTH: 18
<212> TYPE: DNA
<213> ORGANISM: Artificial Sequence
<220> FEATURE:
<223> OTHER INFORMATION: Synthetic Polynucleotide

<400> SEQUENCE: 2
aacgactcat attaacaa                                          18

HIGH DENSITY LIPOPROTEIN MIMETIC NANOPARTICLES USING LIPID CONJUGATED CORE SCAFFOLDS

RELATED APPLICATIONS

This application is a national stage filing under 35 U.S.C. § 371 of international application number PCT/US2020/015109, filed Jan. 24, 2020, which claims the benefit under 35 U.S.C. § 119(e) of U.S. Provisional Application No. 62/796,534, filing Jan. 24, 2019, each of which is incorporated by reference in its entirety.

GOVERNMENT SUPPORT

This invention was made with government support under Contract No. FA9550-13-1-0192, awarded by the Air Force Office of Scientific Research (AFOSR) and grant number AG062999 awarded by the National Institutes of Health. The government has certain rights in the invention.

BACKGROUND OF THE INVENTION

Nanoparticles are in the submicron size domain and possess unique size-dependent properties that make the materials superior compared to their bulk forms. The advanced chemical and physical properties associated with nanoparticles have led to their extensive use in the fields of biology and medicine. High-density lipoproteins (HDL) are dynamic nanoparticles that circulate in the blood.

SUMMARY OF THE INVENTION

The present disclosure presents the synthesis of soft-core, HDL-like nanoparticles with the size, shape, surface chemistry, composition, protein structure, and cholesterol transport properties that are consistent with mature human HDLs. Lipid-conjugated (LC) HDL NPs target relevant cell types to remove and deliver cellular cholesterol and reduce inflammation, recapitulating salient functions of human HDLs. Because synthesis of LC HDL NPs is straightforward and does not require time-intensive and costly enzymatic maturation steps, it is anticipated that these nanoparticles will prove to be strong candidates for next generation HDL-based therapeutics.

Additionally, the present disclosure provides methods for the synthesis and characterization of a spherical HDL mimic using lipid-conjugated organic core scaffolds. The core design motif constrains and orients phospholipid geometry to facilitate the assembly of soft-core nanoparticles that in some embodiments are approximately 10 nm in diameter and resemble human HDLs in their size, shape, surface chemistry, composition and protein secondary structure.

In some aspects, the present disclosure provides a spherical high-density lipoprotein nanoparticle (HDL-NP) comprising: a core and a shell surrounding and attached to the core, wherein the core comprises a lipid conjugated organic core scaffold. In some embodiments, the shell is a lipid shell. In some embodiments, the shell is a lipid bilayer or monolayer. In some embodiments, the spherical HDL-NP has a zeta potential of about −20 mV. In some embodiments, the organic core scaffold comprises $PL_4$. In some embodiments, the organic core scaffold comprises 9-DNA-$PL_4$. In some embodiments, the organic core scaffold comprises 18-DNA-$PL_4$. In some embodiments, the shell has a zeta potential closer to human HDL than a synthetic HDL nanoparticle with an inorganic core. In some embodiments, the spherical HDL-NP has a zeta potential closer to human HDL than a synthetic HDL nanoparticle with a gold core. In some embodiments, the spherical HDL-NP has an apolipoprotein. In some embodiments, the apolipoprotein is apolipoprotein A-I.

In some aspects, the present disclosure provides a composition comprising any one of the spherical HDL-NP described above.

In some aspects, the present disclosure provides a method of treating an inflammatory disorder comprising, administering to a subject an effective amount of a composition comprising any one of the spherical HDL-NP described above.

In some aspects, the present disclosure provides a method of reducing NF-kB activity, comprising administering to a subject an effective amount of a composition comprising any one of the spherical HDL-NP described above.

The details of one or more embodiments of the invention are set forth in the description below. Other features or advantages of the present invention will be apparent from the following drawings and detailed description of several embodiments, and also from the appended claims.

In an aspect, the disclosure relates to a spherical high-density lipoprotein nanoparticle (HDL-NP) comprising, a core and a shell surrounding and attached to the core, wherein the core comprises a lipid conjugated organic core scaffold.

In some embodiments, the shell is a lipid shell. In some embodiments, the shell is a lipid bilayer or monolayer. In some embodiments the shell is a lipid bilayer. In some embodiments, the shell is a lipid monolayer.

In some embodiments, the spherical HDL-NP has a surface zeta potential of about −20 millivolts (mV).

In some embodiments, the organic core scaffold comprises $PL_4$. In some embodiments, the organic core scaffold comprises 9-DNA-$PL_4$. In some embodiments, the organic core scaffold comprises 18-DNA-$PL_4$.

In some embodiments, the shell has a zeta potential closer to human HDL than a synthetic HDL nanoparticle with an inorganic core. In some embodiments, the spherical HDL-NP has a zeta potential closer to human HDL than a synthetic HDL nanoparticle with a gold core. In some embodiments, the spherical HDL-NP has a zeta potential of −16-26 mV.

In some embodiments, the spherical HDL-NP of the instant disclosure further comprise apolipoprotein. In some embodiments, the apolipoprotein is apolipoprotein A-I.

In some embodiments, the spherical HDL-NP of the instant disclosure, comprise a hydrodynamic diameter of greater than 8.7 nm. In some embodiments, the hydrodynamic diameter is 8.7 nm-17-7 nm. In some embodiments, the hydrodynamic diameter is 10 nm-15 nm. In some embodiments, the hydrodynamic diameter is 12 nm-14 nm.

In some embodiments, the organic core scaffold comprises a hydrophobic small molecule-phospholipid conjugate ($PL_4$). In some embodiments, the $PL_4$ comprises a headgroup-modified phospholipid. In some embodiments, the headgroup-modified phospholipid comprises a ring-strained alkyne, 1,2-dipalmitoyl-sn-glycero-3-phospho-ethan-olamine-N-dibenzocyclooctyl. In some embodiments, the phospholipid is coupled to the small molecule with a plurality of terminal functional groups. In some embodiments, the small molecule is tetrakis(4-az-idophenyl)methane. In some embodiments, the plurality of functional groups is 2-6 functional groups. In some embodiments, the plurality of functional groups is 4 functional groups. In some embodiments, the functional groups are terminal azides (SM-Az).

In other embodiments, the organic core scaffold comprises an amphiphilic DNA-linked small molecule-phospholipid conjugate (DNA-PL$_4$). In some embodiments, the DNA is a double stranded oligonucleotide of 5-17 nucleotides in length. In some embodiments, the DNA is a double stranded oligonucleotide of 8-15 nucleotides in length. In some embodiments, the DNA is a double stranded oligonucleotide of 9 nucleotides in length. In some embodiments, a first single strand of the double stranded DNA is linked to a phospholipid and forms a ssDNA-phospholipid conjugate (ssDNA-PL). In some embodiments, a second strand of the double stranded DNA, complementary to the first strand of the double stranded DNA is linked to a small molecule. In some embodiments, the small molecule is a tetrahedral small molecule and the small molecule linked to the DNA forms a tetrahedral small molecule-DNA hybrid (SMDH$_4$). In some embodiments, the SMDH$_4$ is linked to the ssDNA-PL through hydrogen bonding between the complementary single strands of DNA.

In some embodiments, the spherical HDL-NP has a more efficient cholesterol transport capacity than that of apolipoprotein or a synthetic HDL nanoparticle with a gold core.

In some embodiments the spherical HDL-NP has a diameter of about 5-30 nm, 5-25 nm, 5-22 nm, 5-20 nm, 5-15 nm, 5-14 nm, 5-13 nm, 5-12 nm, 5-11 nm, 5-10 nm, 8-15 nm, 8-14 nm, 8-13 nm, 8-12 nm, 8-11 nm, 8-10 nm, 10-12 nm, or 10 nm.

In some embodiments, the spherical HDL-NP further comprises a therapeutic agent linked to the HDL-NP. In some embodiments, the therapeutic agent is a therapeutic nucleic acid. In some embodiments, the therapeutic agent is an anti-cancer agent. In some embodiments, the anti-cancer agent is chemotherapeutic agent. In some embodiments, the therapeutic agent is an anti-inflammatory agent.

In other aspects the invention is a method for treating a cancer, comprising administering to a subject having a cancer a spherical high-density lipoprotein nanoparticle (HDL-NP) comprising: a core and a shell surrounding and attached to the core, wherein the core comprises a lipid conjugated organic core scaffold in an effective amount to treat the cancer.

In other aspects a method of treating an inflammatory disorder by administering to a subject having an inflammatory disorder a spherical high-density lipoprotein nanoparticle (HDL-NP) comprising: a core and a shell surrounding and attached to the core, wherein the core comprises a lipid conjugated organic core scaffold in an effective amount to treat the inflammatory disorder is provided.

In an aspect, the disclosure relates to a pharmaceutical composition comprising any of the spherical HDL-NP of the instant disclosure.

In an aspect, the disclosure relates to method of treating cancer or an inflammatory disorder comprising, administering to a subject an effective amount of a composition comprising the spherical HDL-NP of the instant disclosure.

In an aspect, the disclosure relates to a method of reducing NF-kB activity, comprising administering to a subject an effective amount of a composition comprising any of the spherical HDL-NP of the instant disclosure.

In an aspect, the disclosure relates to a method for making a spherical high-density lipoprotein nanoparticle (HDL-NP) comprising, preparing a ssDNA-phospholipid conjugate (ssDNA-PL), preparing a tetrahedral small molecule-DNA hybrid (SMDH$_4$), wherein the ssDNA-PL and SMDH$_4$ have complementary DNA sequences, incubating the ssDNA-PL and SMDH$_4$ such that the complementary DNA sequences bases pair with one another to form a DNA-PL core, and adding to the DNA-PL core phospholipid liposomes and apolipoprotein to produce the spherical HDL-NP.

In some embodiments, the ssDNA-PL comprises an oligonucleotide of at least 9 nucleotides. In some embodiments, the oligonucleotide is 6-16 nucleotides in length. In some embodiments, the oligonucleotide comprises SEQ ID NO: 1. In some embodiments, the oligonucleotide is 18 nucleotides in length. In some embodiments, the oligonucleotide comprises SEQ ID NO: 2.

In some embodiments, the SMDH$_4$ comprises an oligonucleotide of at least 9 nucleotides. In some embodiments, the oligonucleotide is 9-15 nucleotides in length. In some embodiments, the oligonucleotide comprises SEQ ID NO: 3. In some embodiments, the oligonucleotide is 18 nucleotides in length. In some embodiments, the oligonucleotide comprises SEQ ID NO: 4.

In some embodiments, the apolipoprotein of any of the methods disclosed herein is apolipoprotein A-I.

In an aspect, the disclosure relates to an organic core scaffold comprising, 1,2-dipalmitoyl-sn-glycero-3-phosphoethanolamine-N-dibenzocyclooctyl (DBCO PE) linked to a tetrahedral small molecule core (tetrakis(4-azidophenyl) methane) with four terminal azides.

Each of the limitations of the invention can encompass various embodiments of the invention. It is, therefore, anticipated that each of the limitations of the invention involving any one element or combinations of elements can be included in each aspect of the invention. This invention is not limited in its application to the details of construction and the arrangement of components set forth in the following description or illustrated in the drawings. The invention is capable of other embodiments and of being practiced or of being carried out in various ways. The details of one or more embodiments of the invention are set forth in the accompanying Detailed Description, Examples, Claims, and Figures. Other features, objects, and advantages of the invention will be apparent from the description and from the claims.

BRIEF DESCRIPTION OF THE DRAWINGS

The following drawings form part of the present specification and are included to further demonstrate certain aspects of the present disclosure, which can be better understood by reference to one or more of these drawings in combination with the detailed description of specific embodiments presented herein. For purposes of clarity, not every component may be labeled in every drawing. It is to be understood that the data illustrated in the drawings in no way limit the scope of the disclosure. In the drawings:

FIG. 2D shows the composition of native and synthetic HDLs by mass percent (%). *Au HDL NP composition is reported from a previously published data set.[18] FIG. 2E shows circular dichroism spectra for LC HDL NPs and human HDLs. FIG. 2F shows a schematic of native and synthetic HDL species which vary in their core materials. FIG. 2G shows TEM imaging of DNA-PL$_4$ HDL NPs (9-mer DNA) at 98,000× magnification. Scale bar=50 nm.

FIG. 3B shows the quantification of H$^3$-chol in all fractions from a tandem efflux-influx assay. FIG. 3C shows the percent (%) Influx of cholesterol to hepatocytes in tandem assay. FIG. 3D shows SR-B1 dependent cholesterol efflux. Statistical significance was determined using a two-tailed student's t test. p<0.01.* p<0.001.

FIG. 5B shows LC HDL NP-mediated suppression of pro-inflammatory NF-kB signaling. Statistical significance was determined using a two-tailed student's t test. *p<0.05. ** p<0.01.

DETAILED DESCRIPTION OF THE INVENTION

High-density lipoproteins (HDL) are native circulating nanoparticles that carry cholesterol, target specific cell types, and play important roles in a host of disease processes. As a result, synthetic HDL mimics have become promising therapeutic agents. However, approaches to date have been unable to reproduce key features of spherical HDLs, which are the most abundant HDL species, and are of particular clinical importance.

Native HDLs are circulating nanoparticles (~8-13 nm in diameter) that transport cholesterol and play important roles in cancer and cardiovascular disease. Spherical HDLs are the most abundant HDL sub-species, and are particularly important clinically. However, previous HDL mimics have failed to reproduce features of spherical HDL (e.g. spherical HDL conformation) without relying on inorganic template materials (e.g. gold nanoparticles). Herein, it was unexpectedly found that the spherical HDL conformation could be achieved in HDL-like nanoparticles having lipid-conjugated organic core scaffolds. These HDL-like nanoparticles of the present disclosure are the first of their kind, namely spherical HDL mimics with a soft material core.

The HDL-like nanoparticles of the present disclosure mimic spherical HDL species using novel, lipid-conjugated organic core scaffolds. The core design motif constrains and orients phospholipid geometry to facilitate the assembly of soft-core nanoparticles that are, in some embodiments, approximately 10 nm in diameter and resemble human HDLs in their size, shape, surface chemistry, composition and protein secondary structure. The HDL-like nanoparticles mimic the structure of native HDL with respect to size (~10 nm), surface chemistry (~20 mV zeta potential), and HDL protein secondary structure as determined by circular dichroism. Synthetic HDLs have demonstrated promise as therapy for cardiovascular disease and cancer, among other indications. Two of the primary features of synthetic HDL mimics which are required for recapitulating salient HDL functions are 1) a soft material core, and 2) a spherical conformation. The HDL-like nanoparticles of the present disclosure are designed to enable superior therapeutic efficacy when compared to previous synthetic platforms, none of which reproduce both of the features noted above.

High-density lipoproteins (HDL) are dynamic nanoparticles that circulate in the blood and transport cholesterol. Clinically, elevated HDL cholesterol levels are associated with reduced risk of atherosclerotic cardiovascular disease (ASCVD).[1-2] At the cellular level, HDLs target macrophages and hepatocytes to remove and deliver cholesterol, respectively, which has been shown to reduce inflammation and atherosclerotic burden.[3-4] Due to the beneficial association between HDL and ASCVD, cell-specific targeting properties, and the intrigue of using HDLs for targeted drug delivery, tremendous effort has focused on synthesizing HDLs that resemble their natural counterparts.[5]

Figure 1:
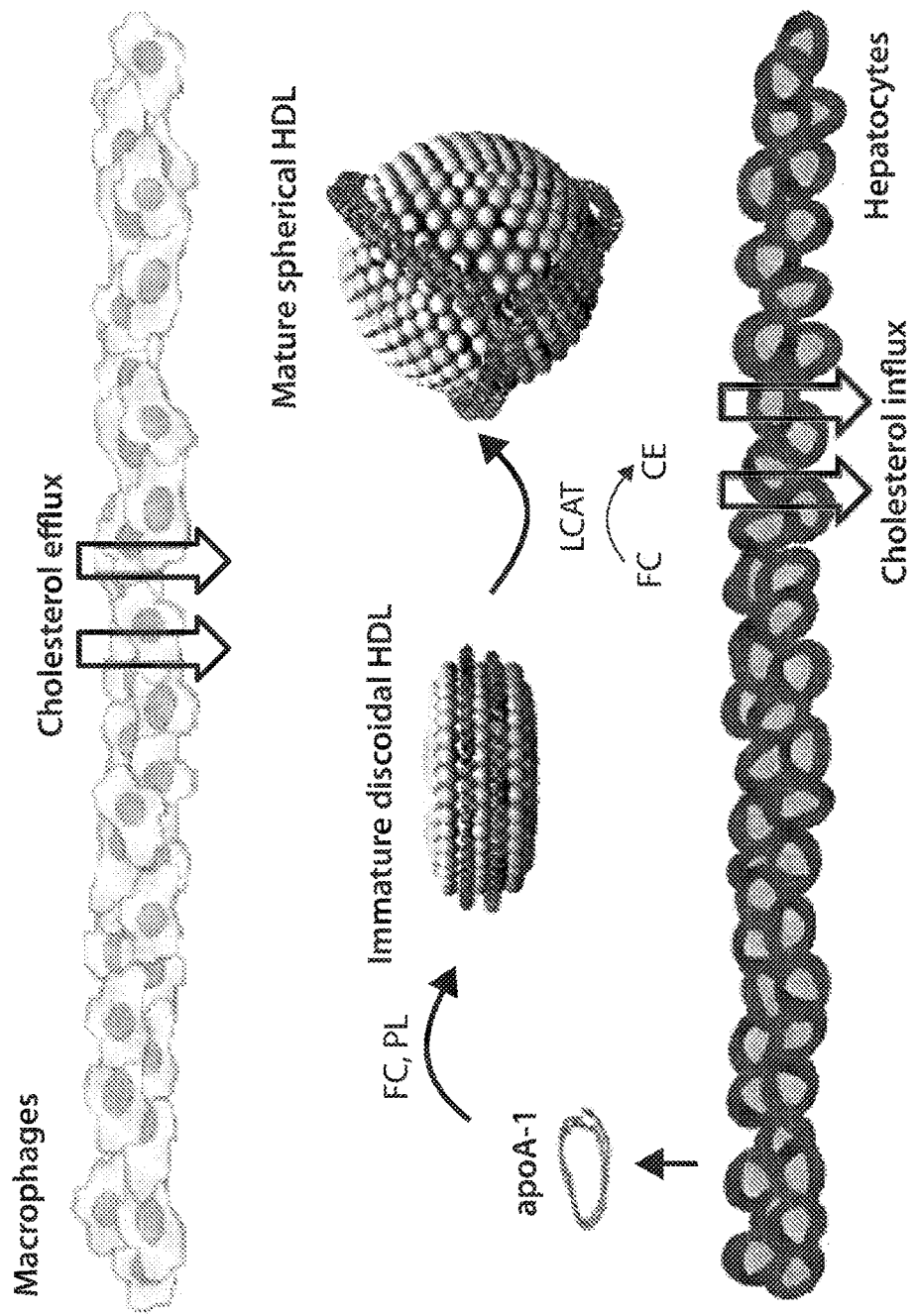
FIG. 1 shows the canonical reverse cholesterol transport pathway. Abbreviations: FC: free cholesterol. CE: cholesteryl esters. PL: phospholipids. LCAT: lecithin:cholesterol acyltransferase.

There are multiple HDL species in the blood that serve as synthetic targets. Immature HDLs are cholesterol poor and discoidal in shape, consisting mainly of the HDL-defining protein, apolipoprotein A-I (which may be referred to herein as apoA-I, apoA-1, and/or apolipoprotein A-1), and phospholipids. Mature forms of HDL, which also harbor apoA-I and a surface layer of phospholipids, are cholesterol and cholesteryl ester rich, and assume more spherical shapes (FIG. 1). Spherical HDLs comprise the majority of HDLs in circulation.[6-7] Yet, synthetic forms of HDL used as therapy have exclusively resembled immature discoidal HDL.[8] This is largely because these recombinant forms of HDL (rHDL) are relatively easy to make by self-assembling phospholipids and apoA-I.[8-12] Clinical trials using rHDLs have shown some promise, but reveal that there is significant room for improvement with regard to making more potent and effective synthetic HDLs.[10-12]

Spherical HDL species are most correlated with reduced ASCVD.[13] However, these HDLs are more difficult to synthesize due to the enzymatic steps required to mature discoidal HDLs into cholesterol- and cholesteryl ester-containing spherical HDLs. Previous studies have attempted to circumvent these biological maturation steps by using inorganic nanoparticles as templates.[14-16] The templates can be functionalized with phospholipids and apoA-I, and successfully restrict the size of HDL mimics to <15 nm diameter.[17] However, these materials fail to recapitulate a critical feature of native spherical HDL, namely a robust, soft material core capable of dynamically loading and off-loading cholesterol and cholesteryl esters. Apart from inorganic template materials, soft-core discoidal HDL-like particles have also been synthesized using amphiphilic peptides.[22]

Herein, the synthesis of HDL mimetic nanoparticles using lipid-conjugated core scaffolds (LC HDL NPs) is accomplished in a two-step process: first, the core scaffolds are synthesized and purified; second, the particle is fabricated via supramolecular assembly of the core scaffold, free phospholipids, and the HDL-defining protein, apolipoprotein A1 (apo-A1). A variety of lipid-conjugated organic cores can theoretically be used for particle assembly. Herein, successful particle fabrication using three different organic core scaffolds is demonstrated. Specifically, a tetrahedral small molecule-phospholipid hybrid, called $PL_4$, and a tetrahedral ssDNA-phospholipid-small molecule hybrid, called $DNA-PL_4$, of two different lengths are used.

Figure 2A:
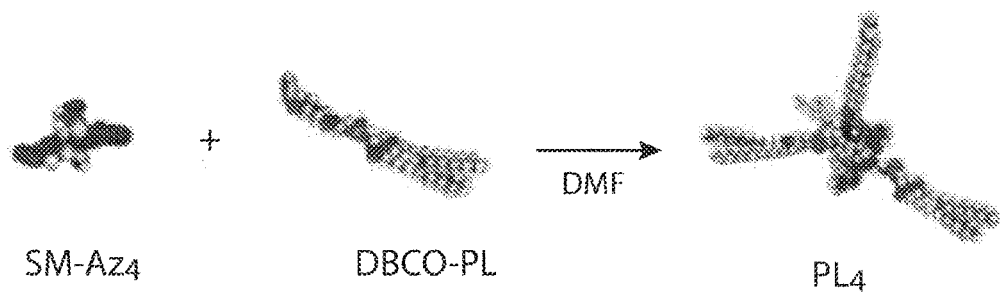
FIGS. 2A-2G FIGS. 2A-2C show synthesis schemes for PL$_4$ and DNA-PL$_4$ core scaffolds, and LC HDL NP assembly.
Figure 2B:
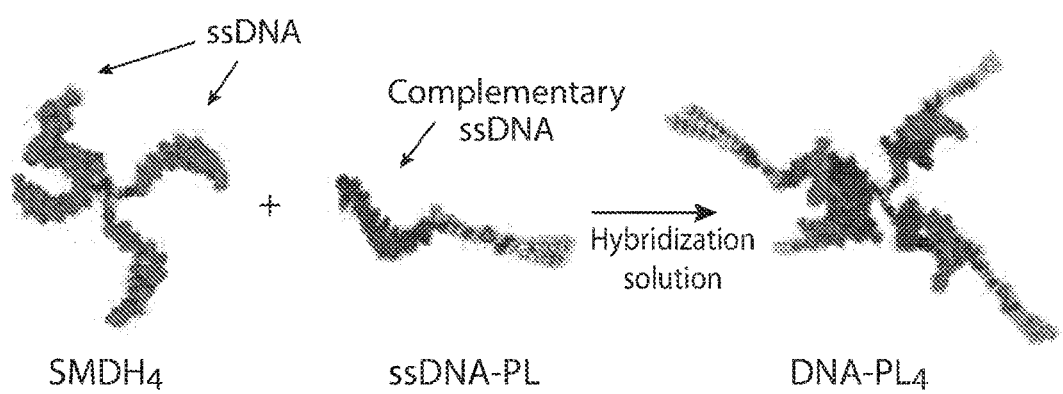
Figure 11:
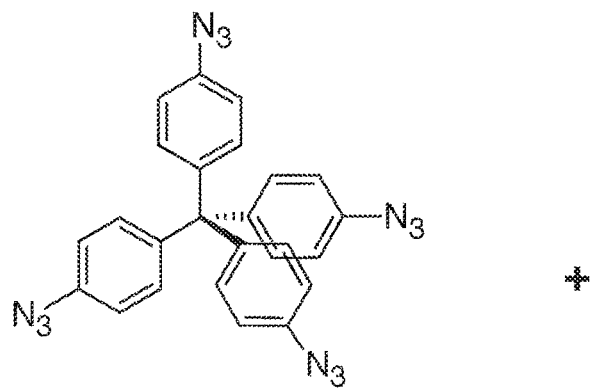
FIG. 11 PL$_4$ synthesis scheme. PL$_4$ core materials were synthesized by copper-free click chemistry conjugation of 1,2-dipalmitoyl-sn-glycero-3-phosphoethanolamine-N-dibenzocyclooctyl (DBCO PE) with a tetrahedral small molecule core (tetrakis(4-azidophenyl)methane) with four terminal azides (FIG. 11). In a typical reaction, the DBCO PE and tetrakis(4-azidophenyl)methane were each dissolved at 0.1 wt % in N,N-dimethylformamide (DMF, Sigma Aldrich) and mixed at a 10:1 molar ratio of DBCO PE to tetrakis(4-azidophenyl)methane in DMF. The reaction mixture was subjected to three rounds of alternating vortexing and bath sonication, and was then allowed to react at room temperature under vortex for 24 hour. HPLC and electrospray ionization mass spectrometry (FIG. 12) was then used to characterize the resulting reaction mixture. As FIG. 12 only show a single species at the right mass for PL$_4$, we conclude that there is no partially coupled product (PL$_3$, PL$_2$, etc.) and use the reaction mixture for the assembly step. As the assembly step involves adding a large excess of DPPC lipids, there is no need to separate the excess DBCO PE molecule from the PL$_4$ core prior to its use in the assembly.
Figure 11:
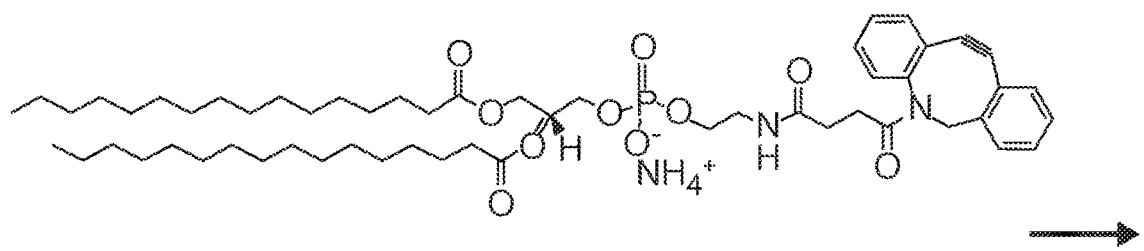
Figure 11:
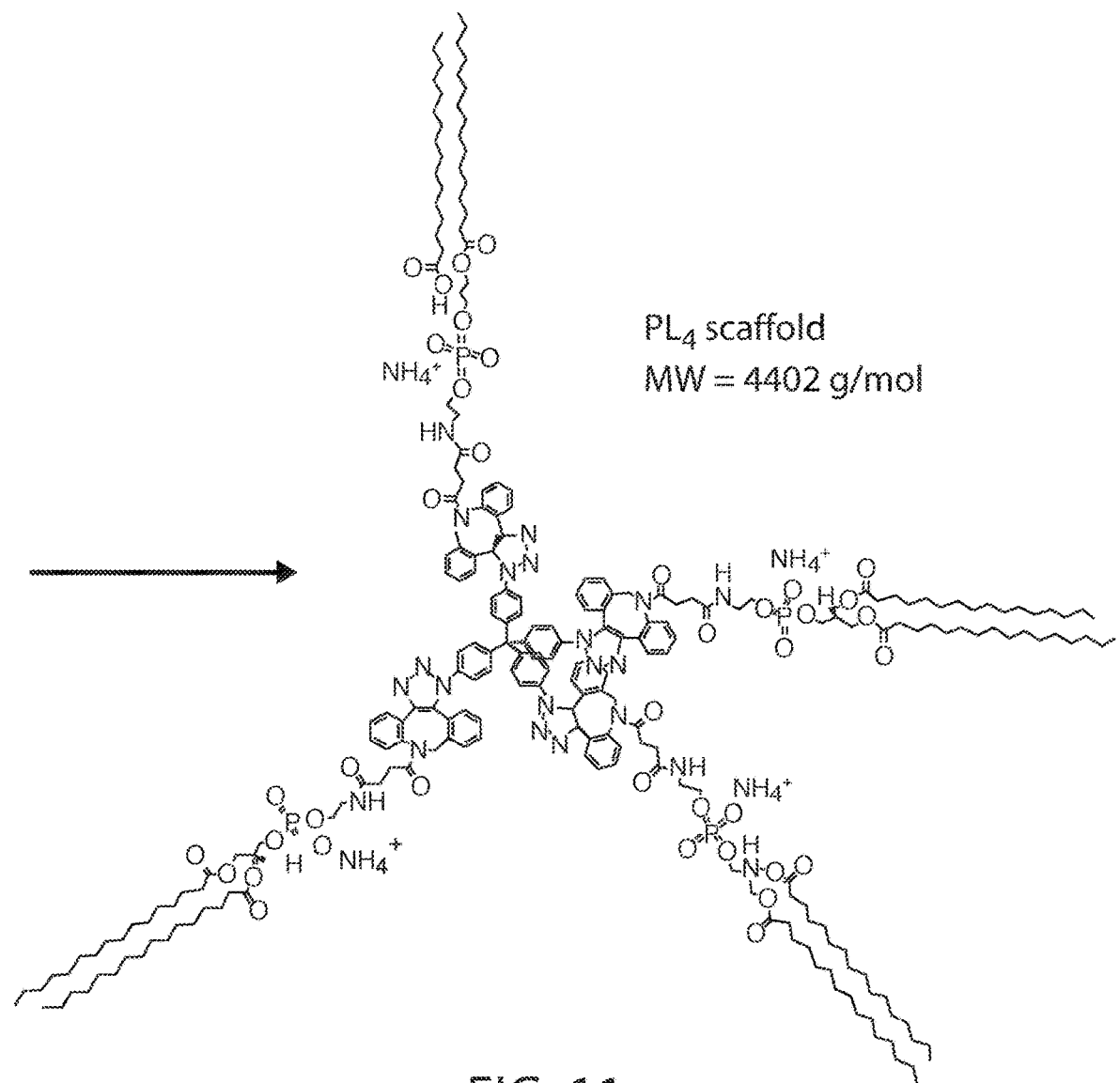
Figure 12:
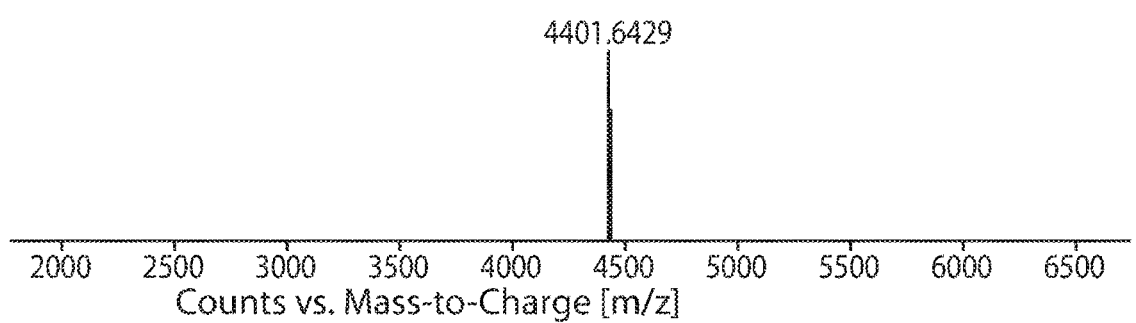
FIG. 12 shows an electrospray ionization mass spectrometry of PL$_4$ core. Product m/z=4401.6 (Theoretical: 4401.7).

The present disclosure provides methods for the synthesis of spherical HDL-like nanoparticles with structural and functional properties of mature human HDLs using lipid-conjugated core scaffolds (LC HDL NP). Three organic scaffolds varying in size and composition, but of the same tetrahedral geometry, were investigated. The first scaffold is a highly hydrophobic small molecule-phospholipid conjugate ($PL_4$) that was synthesized using copper-free click chemistry. Specifically, a headgroup-modified phospholipid harboring a ring-strained alkyne, 1,2-dipalmitoyl-sn-glycero-3-phosphoethan-olamine-N-dibenzocyclooctyl, was click coupled to tetrakis(4-az-idophenyl)methane, a small molecule with four terminal azides (SM-Az4) (FIG. 2A and FIGS. 11-12). In contrast to the $PL_4$ core, the second (9-DNA-$PL_4$) and third (18-DNA-$PL_4$) core scaffolds are amphiphilic DNA-linked $PL_4$ cores (FIG. 2B), with differing DNA linker length (9- vs. 18-mer dsDNA). While hydrophilic DNA linkers enhance the core's solubility in aqueous solution, externally oriented phospholipid tail groups enable hydrophobic interaction with apoA-1 and phospholipids. The size of these cores can be easily tuned by incorporating DNA linkers of different length. DNA-$PL_4$ cores were synthesized in a two-step fashion (see Synthesis section herein). First, DNA-phospholipid conjugates (ssDNA-PL), and tetrahedral small molecule-DNA hybrids ($SMDH_4$), were synthesized (Table 2). Second, ssDNA-PL and $SMDH_4$ with complementary base-paired sequences were hybridized to yield the final DNA-$PL_4$ cores (FIG. 2B and FIGS. 6-9).

Figure 5A:
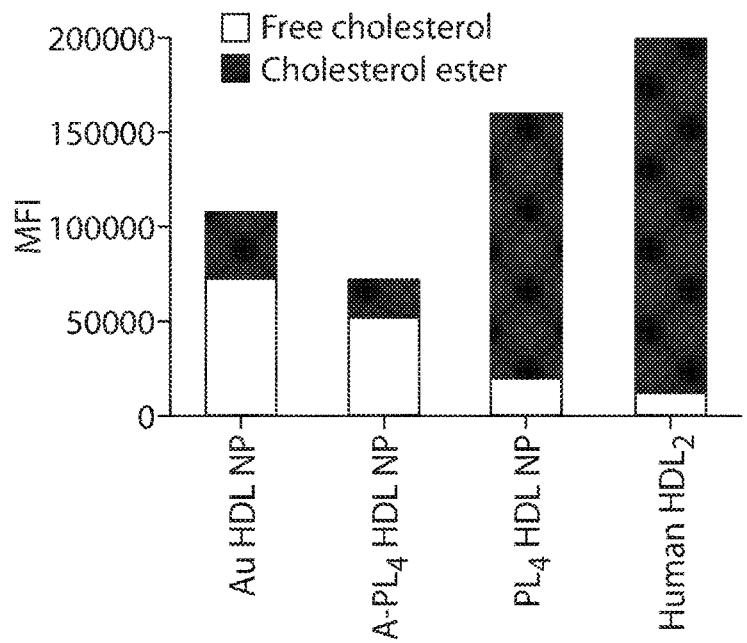
FIGS. 5A-5B FIG. 5A shows the quantification of free cholesterol (FC) and cholesterol esters (CE) in an LCAT cholesterol esterification assay.

The mechanism by which nascent HDLs mature into spherical HDLs is by supporting the enzymatic esterification of free cholesterol, a reaction carried out in the blood by the enzyme lecithin:cholesterol acyl transferase (LCAT). Herein, it was found that both $PL_4$ and DNA-$PL_4$ HDL NPs were able to support LCAT-mediated esterification (FIG. 5A). However, $PL_4$ HDL NPs exhibited a substantially greater capacity for esterification over Au HDL NPs and DNA-$PL_4$ HDL NPs, converting 87% of bound cholesterol to cholesteryl esters. This result is likely due to the increased flexibility and hydrophobicity of the $PL_4$ core over gold (Au) and DNA-$PL_4$ cores, which enables efficient packing of cholesteryl esters.

As used herein, the terms "HDL-like", "HDL-mimetic", and "HDL mimic" are used interchangeably to refer to a synthetic HDL-NP.

In some aspects, the present disclosure provides a spherical high-density lipoprotein nanoparticle (HDL-NP) comprising: a core and a shell surrounding and attached to the core, wherein the core comprises a lipid conjugated organic core scaffold. The shell may be a lipid shell that is linked to the components of the organic core scaffold at one or more points, as shown schematically in FIG. 1. In some embodiments, the shell is a lipid bilayer or monolayer.

In one set of embodiments, a structure described herein or a portion thereof, such as a shell of a structure, includes one or more natural or synthetic lipids or lipid analogs (i.e., lipophilic molecules). One or more lipids and/or lipid analogues may form a single layer or a multi-layer (e.g., a bilayer) of a structure. In some instances where multi-layers are formed, the natural or synthetic lipids or lipid analogs interdigitate (e.g., between different layers). Non-limiting examples of natural or synthetic lipids or lipid analogs include fatty acyls, glycerolipids, glycerophospholipids, sphingolipids, saccharolipids and polyketides (derived from condensation of ketoacyl subunits), and sterol lipids and prenol lipids (derived from condensation of isoprene subunits).

In one particular set of embodiments, a structure described herein includes one or more phospholipids. The one or more phospholipids may include, for example, phosphatidylcholine, phosphatidylglycerol, lecithin, β, γ-dipalmitoyl-α-lecithin, sphingomyelin, phosphatidylserine, phosphatidic acid, N-(2,3-di(9-(Z)-octadecenyloxy))-prop-1-yl-N,N,N-trimethylammonium chloride, phosphatidylethanolamine, lysolecithin, lysophosphatidylethanolamine, phosphatidylinositol, cephalin, cardiolipin, cerebrosides, dicetylphosphate, dioleoylphosphatidylcholine, dipalmitoylphosphatidylcholine, dipalmitoylphosphatidylglycerol, dioleoylphosphatidylglycerol, palmitoyl-oleoyl-phosphatidylcholine, di-stearoyl-phosphatidylcholine, stearoyl-palmitoyl-phosphatidylcholine, di-palmitoyl-phosphatidylethanolamine, di-stearoyl-phosphatidylethanolamine, di-myrstoyl-phosphatidylserine, di-oleyl-phosphatidylcholine, 1,2-dipalmitoyl-sn-glycero-3-phosphothioethanol, and combinations thereof. In some cases, a shell (e.g., a bilayer) of a structure includes 50-200 natural or synthetic lipids or lipid analogs (e.g., phospholipids). For example, the shell may include less than about 500, less than about 400, less than about 300, less than about 200, or less than about 100 natural or synthetic lipids or lipid analogs (e.g., phospholipids), e.g., depending on the size of the structure.

Non-phosphorus containing lipids may also be used such as stearylamine, docecylamine, acetyl palmitate, and fatty acid amides. In other embodiments, other lipids such as fats, oils, waxes, cholesterol, sterols, fat-soluble vitamins (e.g., vitamins A, D, E and K), glycerides (e.g., monoglycerides, diglycerides, triglycerides) can be used to form portions of a structure described herein.

A portion of a structure described herein such as a shell or a surface of a nanostructure may optionally include one or more alkyl groups, e.g., an alkane-, alkene-, or alkyne-containing species, that optionally imparts hydrophobicity to the structure. An "alkyl" group refers to a saturated aliphatic group, including a straight-chain alkyl group, branched-chain alkyl group, cycloalkyl (alicyclic) group, alkyl substituted cycloalkyl group, and cycloalkyl substituted alkyl group. The alkyl group may have various carbon numbers, e.g., between $C_2$ and $C_{40}$, and in some embodiments may be greater than $C_5$, $C_{10}$, $C_{15}$, $C_{20}$, $C_{25}$, $C_{30}$, or $C_{35}$. In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6 or 7 carbons in the ring structure. Examples of alkyl groups include, but are not limited to, methyl, ethyl, propyl, isopropyl, cyclopropyl, butyl, isobutyl, tert-butyl, cyclobutyl, hexyl, cyclochexyl, and the like.

In some embodiments, the spherical HDL-NP of the instant disclosure further comprise apolipoprotein. The apolipoprotein can be apolipoprotein A (e.g., apo A-I, apo A-II, apo A-IV, and apo A-V), apolipoprotein B (e.g., apo B48 and apo B100), apolipoprotein C (e.g., apo C-I, apo C-II, apo C-III, and apo C-IV), and apolipoproteins D, E, and H. Specifically, apo A1, apo A2, and apo E promote transfer of cholesterol and cholesteryl esters to the liver for metabolism and may be useful to include in structures described herein. Additionally or alternatively, a structure described herein may include one or more peptide analogues of an apolipoprotein, such as one described above. Of course, other proteins (e.g., non-apolipoproteins) can also be included in the nanostructures described herein. In some embodiments, the apolipoprotein is apolipoprotein A-I.

The HDL-NP has an organic core scaffold. An organic core scaffold as used herein refers to non-metallic material, soft-core, having a 3 dimensional structure and charge sufficient to organize and hold a lipid layer in a spherical shape. A "spherical" shape or structure herein refers to a structure having a round or sphere-like structure. The structure does not need to be perfectly round or an exact sphere, but rather is an approximate sphere shape.

In some embodiments, the organic core scaffold comprises a hydrophobic small molecule-phospholipid conjugate ($PL_4$). The hydrophobic small molecule-phospholipid conjugate comprises any small molecule capable of being linked to a phospholipid. In some embodiments, the small molecule is tetrakis(4-az-idophenyl)methane.

In some embodiments, the phospholipid may be a headgroup-modified phospholipid. In some embodiments, the headgroup-modified phospholipid comprises a ring-strained alkyne, 1,2-dipalmitoyl-sn-glycero-3-phosphoethanolamine-N-dibenzocyclooctyl.

The small molecule may be linked directly to the phospholipid or may be linked through the use of a functional group. The functional group may include any suitable end group that can be used to functionalize the phospholipid to the small molecule, e.g., an amino group (e.g., an unsubstituted or substituted amine), an amide group, an azide, an imine group, a carboxyl group, or a sulfate group. In some instances, the functional group includes at least a second end group. In other embodiments, the second end group may be a reactive group that can covalently attach to another functional group. In some embodiments, the phospholipid is coupled to the small molecule with a plurality of terminal functional groups. In some embodiments, the plurality of functional groups is 2-6 functional groups. In some embodiments, the plurality of functional groups is 4 functional groups. In some embodiments, the functional groups are terminal azides (SM-Az).

In other embodiments, the organic core scaffold comprises an amphiphilic DNA-linked small molecule-phospholipid conjugate (DNA-$PL_4$). The DNA (or any other nucleic acid, including modified and naturally occurring nucleic acids) provides a unique link between the phospholipid and small molecule. It is advantageous to use DNA because the size of the DNA and thus the core may be easily controlled by altering the length of the DNA strand. In some embodiments the DNA is 5-50 nucleotides in length In other embodiments the DNA is 5-45, 5-40, 5-35, 5-30, 5-25, 5-20, 5-17, 5-16, 5-15, 5-14, 5-13, 5-12, 5-11, 5-10, 5-9, 5-8, 5-7, 6-45, 6-40, 6-35, 6-30, 6-25, 6-20, 6-17, 6-16, 6-15, 6-14, 6-13, 6-12, 6-11, 6-10, 6-9, 6-8, 6-7, 7-45, 7-40, 7-35, 7-30, 7-25, 7-20, 7-17, 7-16, 715, 7-14, 7-13, 7-12, 7-11, 7-10, 7-9, 7-8, 8-45, 8-40, 8-35, 8-30, 8-25, 8-20, 8-17, 8-16, 8-15, 8-14, 8-13, 8-12, 8-11, 8-10, 8-9, 9-45, 9-40, 9-35, 9-30, 9-25, 9-20, 9-17, 9-16, 9-15, 9-14, 9-13, 9-12, 9-11, or 9-10 nucleotides in length.

In some embodiments, the DNA is a double stranded oligonucleotide. In some embodiments, the DNA is a double stranded oligonucleotide of 8-15 nucleotides in length. In some embodiments, the DNA is a double stranded oligonucleotide of 9 nucleotides in length.

In some embodiments, a first single strand of the double stranded DNA is linked to a phospholipid and forms a ssDNA-phospholipid conjugate (ssDNA-PL). In some embodiments, a second strand of the double stranded DNA, complementary to the first strand of the double stranded DNA is linked to a small molecule. In some embodiments, the small molecule is a tetrahedral small molecule and the small molecule linked to the DNA forms a tetrahedral small molecule-DNA hybrid ($SMDH_4$). In some embodiments, the $SMDH_4$ is linked to the ssDNA-PL through hydrogen bonding between the complementary single strands of DNA.

In some embodiments, the spherical HDL-NP further comprises a therapeutic agent linked to the HDL-NP. In some embodiments, the therapeutic agent is a therapeutic nucleic acid. In some embodiments, the therapeutic agent is an anti-cancer agent. In some embodiments, the anti-cancer agent is chemotherapeutic agent. In some embodiments, the therapeutic agent is an anti-inflammatory agent.

A therapeutic nucleic acid may include any nucleic acid such as but not limited to a polynucleotide, a DNA sequence, a DNA sequence encoding a therapeutic protein, an RNA sequence, a small interfering RNA (siRNA), mRNA, a short-hairpin RNA (shRNA), a micro RNA (miRNA), an antisense oligonucleotide, a triplex DNA, a plasmid DNA (pDNA) or any combinations thereof. In some embodiments, a therapeutic nucleic acid may be treated or chemically modified. For example, a therapeutic nucleic acid may contain inter-nucleotide linkages other than phosphodiester bonds, such as phosphorothioate, methylphosphonate, methylphosphodiester, phosphorodithioate, phosphoramidate, phosphotriester, or phosphate ester linkages, which in some embodiments may confer increased stability. Nucleic acid stability may also be increased by incorporating 3'-deoxythymidine or 2'-substituted nucleotides (substituted with, e.g., an alkyl group) into the nucleic acid during synthesis or by providing the nucleic acid as phenylisourea derivatives, or by having other molecules, such as aminoacridine or poly-lysine, linked to the 3' end of the nucleic acid. Modifications of a RNA and/or a DNA may be present throughout the oligonucleotide or in selected regions of the nucleic acid, e.g., the 5' and/or 3' ends, for example by methylation.

In certain embodiments, the anti-cancer agent is a chemotherapeutic drug such as Paclitaxel, Cisplatin, Carboplatin, Topotican and Doxoribicin.

In an aspect, the disclosure relates to an organic core scaffold comprising, 1,2-dipalmitoyl-sn-glycero-3-phosphoethanolamine-N-dibenzocyclooctyl (DBCO PE) linked to a tetrahedral small molecule core (tetrakis(4-azidophenyl)methane) with 2-6 terminal azides. In some embodiments the structure has 4 terminal azides.

The size, physical properties and functional properties of the HDL-NP of the instant disclosure are similar to that of naturally occurring HDL-NP and distinct from other synthetic HDL-NP. These properties include, for example, spherical shape, surface chemistry, size, hydrodynamic diameter, zeta potential, cholesterol efflux, cholesterol delivery, and therapeutic functions such as suppression of inflammation.

In some embodiments, the spherical HDL-NP of the instant disclosure, can be assessed based on the hydrodynamic diameter. The hydrodynamic diameter of the spherical HDL-NP is similar to that of naturally occurring HDL-NP and distinct from other synthetic HDL-NP. Hydrodynamic diameter assesses the size of a hypothetical hard sphere that diffuses in the same manner as that of the particle being measured and provides an indication of the diffusional properties of the particle that will be indicative of the apparent size of the dynamic hydrated/solvated particle. It may be measured by Dynamic Light Scattering (DLS). In some embodiments the hydrodynamic diameter is greater than 8.7 nm. In some embodiments, the hydrodynamic diameter is 8.7 nm-17.7 nm. In some embodiments, the hydrodynamic diameter is 10 nm-15 nm. In some embodiments, the hydrodynamic diameter is 12 nm-14 nm.

The spherical HDL-like nanoparticles of the present disclosure can have a diameter with a largest cross-sectional dimension (or, sometimes, a smallest cross-section dimension) of, for example, less than or equal to about 500 nm, less than or equal to about 250 nm, less than or equal to about 100 nm, less than or equal to about 75 nm, less than or equal to about 50 nm, less than or equal to about 40 nm, less than or equal to about 35 nm, less than or equal to about 30 nm, less than or equal to about 25 nm, less than or equal to about 20 nm, less than or equal to about 15 nm, or less than or equal to about 5 nm. In some embodiments the spherical HDL-NP has a diameter of about 5-30 nm, 5-25 nm, 5-22 nm, 5-20 nm, 5-15 nm, 5-14 nm, 5-13 nm, 5-12 nm, 5-11 nm, 5-10 nm, 8-15 nm, 8-14 nm, 8-13 nm, 8-12 nm, 8-11 nm, 8-10 nm, 10-12 nm, or 10 nm.

The HDL-like nanoparticles of the present disclosure can have a core with a largest cross-sectional dimension (or, sometimes, a smallest cross-section dimension) of, for example, less than or equal to about 300 nm, less than or equal to about 250 nm, less than or equal to about 100 nm, less than or equal to about 75 nm, less than or equal to about 50 nm, less than or equal to about 40 nm, less than or equal to about 35 nm, less than or equal to about 30 nm, less than or equal to about 25 nm, less than or equal to about 20 nm, less than or equal to about 15 nm, or less than or equal to about 5 nm. In some cases, the core has an aspect ratio of greater than about 1:1, greater than 3:1, or greater than 5:1. As used herein, "aspect ratio" refers to the ratio of a length or a width, where length and width are measured perpendicular to one another, and the length refers to the longest linearly measured dimension.

In some embodiments, the shell has a zeta potential closer to human HDL than a synthetic HDL nanoparticle with an inorganic core. In some embodiments, the spherical HDL-NP has a zeta potential closer to human HDL than a synthetic HDL nanoparticle with a gold core. In some embodiments, the spherical HDL-NP has a zeta potential of −16-26 mV. In some embodiments, the zeta potential of the HDL-like nanoparticles is about −20 millivolts (mV). In some embodiments, the zeta potential of the HDL-like nanoparticles is selected from a group consisting of −10 mV, −12 mV, −14 mV, −16 mV, −18 mV, −20 mV, −22 mV, −24 mV, −26 mV, and −30 mV. In some embodiments, the zeta potential of the HDL-like nanoparticles is greater than −20 mV. In some embodiments, the zeta potential is less than −20 mV. In some embodiments, the zeta potential is that of human HDL. Zeta potential may be assessed using methods known in the art, including the methods disclosed herein.

In some embodiments, the HDL-like nanoparticles of the present disclosure do not include a peptide-based scaffold material.

The compositions and methods of the present disclosure represent a significant step forward, toward a genuine synthetic functional mimic of spherical HDL. The HDL-like nanoparticles (also referred to as synthetic particles or synthetic HDL particle or HDL-NP) of the present disclosure are capable of executing salient HDL functions including cholesterol efflux from macrophages (or from lipid-laden macrophages), cholesterol delivery to hepatocytes, supporting lecithin:cholesterol acyltransferase activity, and suppression of inflammation. Thus, in some embodiments, the spherical HDL-NP has a more efficient cholesterol transport capacity than that of apolipoprotein or a synthetic HDL nanoparticle with a gold core. Cholesterol transport capacity may be assessed using in vitro assays such as the assays described herein. The cholesterol transport capacity may be assessed relative to a standard known value of cholesterol transport or relative to a negative control such a synthetic HDL-NP particle having a gold core or APO-A1 or relative to a positive control such as naturally occurring HDL-NP.

Thus, the compositions and methods of the present disclosure can be used in applications including, but not limited to, cancer therapy, inflammatory disease, cardiovascular disease therapy, bone disease therapy, and immune disease therapy.

There is great promise in the use of synthetic HDLs as a therapy. Clinical trials, prior and ongoing in the field, have demonstrated that reconstituted HDLs can be safely injected in humans, and have shown marginal clinical benefit in the setting of cardiovascular disease. However there is a need for novel approaches to synthetic HDLs that can exert more potent effects. The HDL-like nanoparticles of the present disclosure, due to their novel elements, which include a soft core mimic of spherical HDL, represent strong candidates for substantially enhanced therapeutic effects of synthetic HDLs in the clinic.

Figure 5B:
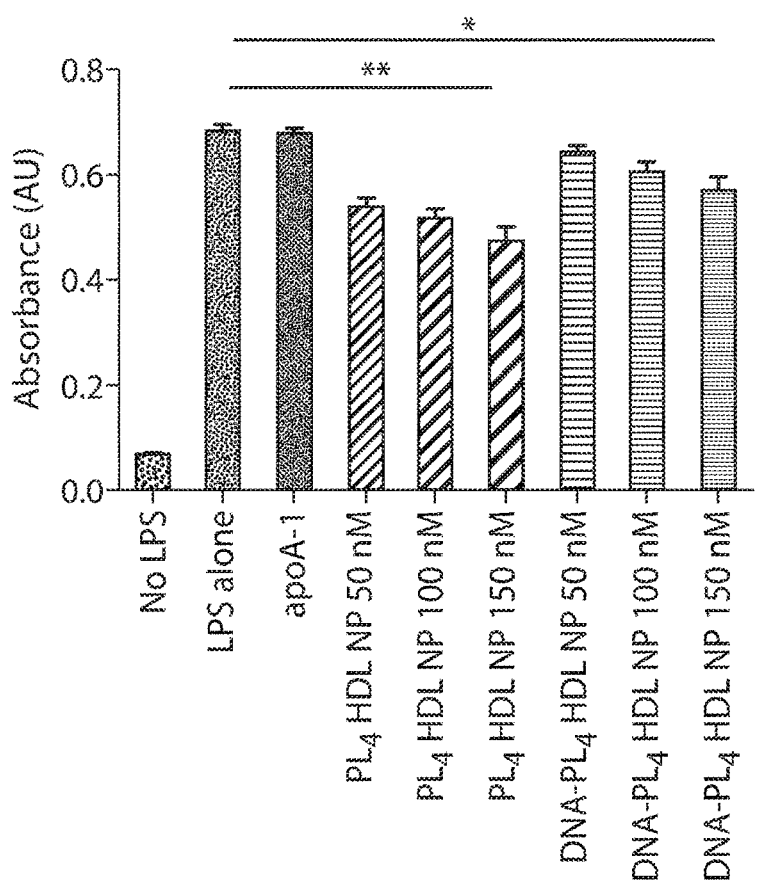
Figure 6:
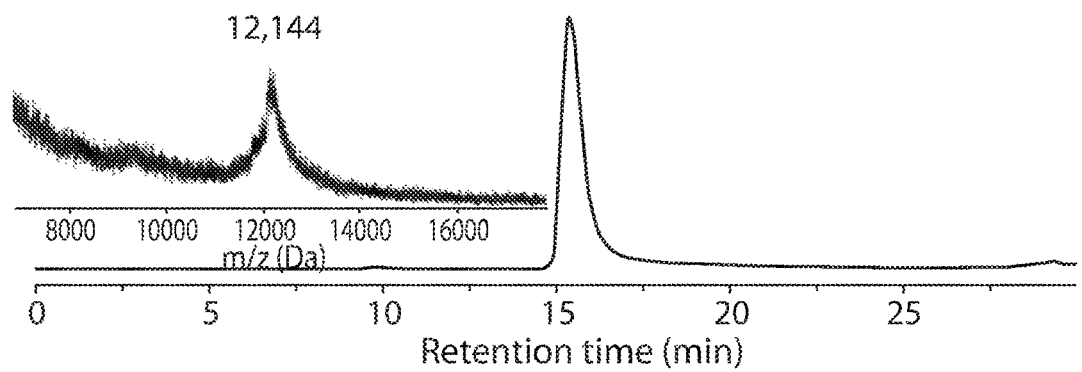
FIG. 6 shows an analytical RP-HPLC trace of 9-SMDH$_4$ (SEQ ID NO: 1) from the coupling reaction of the tetrakis (4-azidophenyl) methane with alkyne-functionalized 9-mer DNAs on the CPGs. The trace is the signal from the diode detector set at 260 nm. Inset shows the MALDI-ToF spectrum of the pure product: m/z=12,144 (12,144.1 theoretical).
Figure 7:
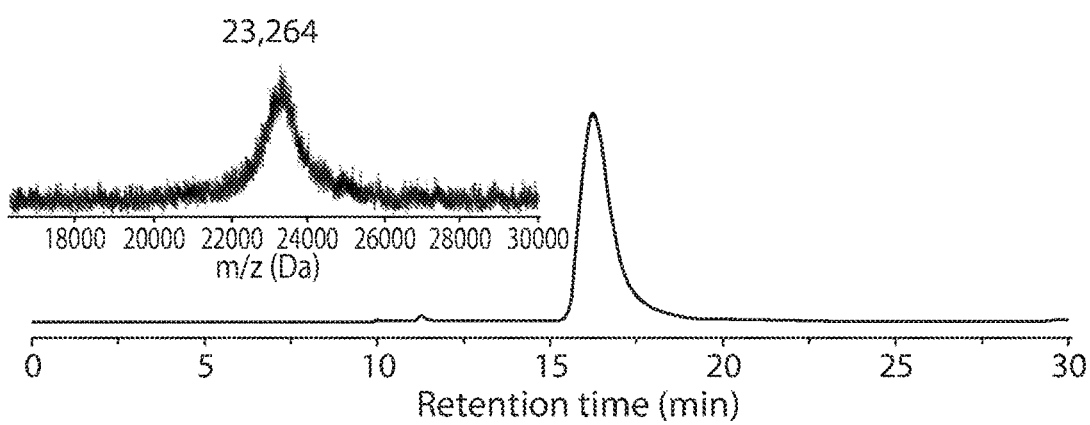
FIG. 7 shows an analytical RP-HPLC trace of 18-SMDH$_4$ (SEQ ID NO: 2) from the coupling reaction of the tetrakis (4-azidophenyl) methane with alkyne-functionalized 18-mer DNAs on the CPGs. The trace is the signal from the diode detector set at 260 nm. Inset shows the MALDI-ToF spectrum of the pure product: m/z=23,264 (23,263.7 theoretical).
Figure 8:
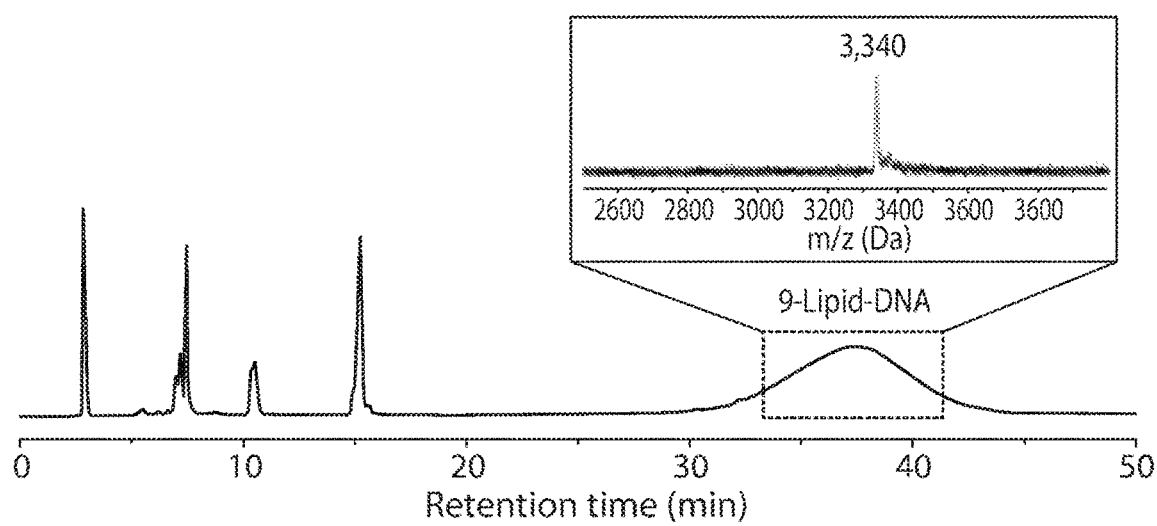
FIG. 8 shows a semi-preparative RP-HPLC trace of crude 9-DNA-lipid (SEQ ID NO: 3). The trace is the signal from the diode detector set at 260 nm. The pure 9-DNA-lipid (SEQ ID NO: 3) at 33-42 min was isolated and identified by MALDI-ToF (Inset): m/z=3,340 (3,342.4 theoretical).

Inflammation promoted by macrophage NF-kB activity is a hall-mark of ASCVD that drives disease progression and increases morbidity and mortality. Herein, to assess the ability of LC HDL NPs to reduce inflammation, a human monocyte reporter cell line (THP1-Dual) was treated with lipopolysaccharide to stimulate NF-kB activity prior to treatment with LC HDL NPs or apoA-1 controls. While apoA-1 alone exhibited no capacity to reduce NF-kB activity, both $PL_4$ HDL NPs and DNA-$PL_4$ HDL NPs reduced NF-kB activity in a dose dependent manner, by 31% and 16% respectively at protein concentrations of 150 nM (FIG. 5B).

In some aspects the invention is a method for treating cardiovascular disease. Cardiovascular disease is a vascular endothelial cell dysfunction and certain symptoms begin, including as conventional or above the heart and vascular system-on, atherosclerosis, hypertension, gojihyeol, coronary heart disease (heart attack), cerebrovascular diseases (stroke, dementia), peripheral vascular disease, arrhythmia, heart failure, congestive heart disease, cardiac disease and for at least the name of the heart and blood vessels, including, but not limited thereto. Some of the main factors of cardiovascular disease include, but they are not limited to expression of genetic factors, lifestyle habits, and complications of diabetes Atherosclerosis is the mechanism by which arteries that supply the heart muscle with oxygen-rich blood become progressively narrowed with cholesterol-rich plaque. These plaques grow and harden over time, reducing blood flow, rupturing and causing a heart attack. Interventions to prop and hold open coronary arteries, such as angioplasty and metal stents, are tremendously common. One critical problem with these therapies is failure due to blood vessel remodeling, called neointimal hyperplasia, whereby smooth muscle cells grow through the stent, re-narrowing the vessel (i.e. restenosis). Drug-eluting stents (DES), coated with drugs to prevent cell growth, do reduce vessel restenosis by limiting the proliferation of smooth muscle cells; however, the drugs also inhibit the growth of endothelial cells that line naturally line blood vessels and prevent clot formation. Patients must remain on potent medications to prevent blood clots, predisposing them to life-threatening bleeding complications.

The invention has tremendous value in improving the success rate of vascular interventions as well as reducing long-term damage caused by atherosclerotic plaque rupture. As used herein cardiovascular diseases included, but are not limited to, arteriosclerosis, coronary heart disease, ischemia, endothelium dysfunction, in particular those dysfunctions affecting blood vessel elasticity, restenosis, thrombosis, angina, high blood pressure, cardiomyopathy, hypertensive heart disease, heart failure, corpulmonale, cardiac dysrhythmias, endocarditis, inflammatory cardiomegaly, myocarditis, myocardial infarction, valvular heart disease, stroke and cerebrovascular disease, aortic valve stenosis, congestive heart failure, and peripheral arterial disease In some embodiments, the compositions of the invention will restore and/or improve cardiovascular parameters to normal ranges in a subject diagnosed with or at risk of a cardiovascular disease. Normal ranges of cardiovascular parameters include but are not limited to, an end-diastolic volume (EDV) from about 65-240 mL, an end-systolic volume (ESV) from about 16-143 m L, a stroke volume from about 55-100 mL, an ejection fraction from about 55-70%, a heart rate from about 60-100 bpm, and/or cardiac output of about 4.0-8.0 L/min.

In other aspects a method of treating an inflammatory disorder by administering to a subject having an inflammatory disorder a spherical high-density lipoprotein nanoparticle (HDL-NP) comprising: a core and a shell surrounding and attached to the core, wherein the core comprises a lipid conjugated organic core scaffold in an effective amount to treat the inflammatory disorder is provided.

The compositions of the invention may also be used to treat inflammatory diseases. Examples of inflammatory diseases include, but are not limited to acne vulgaris, asthma, autoimmune diseases (e.g., acute disseminated encephalomyelitis (ADEM), Addison's disease, agammaglbulinemia, alopecia areata, amyotrophic lateral sclerosis, ankylosing spondylitis, antiphospholipid syndrome, antisynthetase syndrome, atopic allergy, atopic dermatitis, autoimmune aplastic anemia, autoimmune cardiomyopathy, autoimmune enteropathy, autoimmunehemolytic anemia, autoimmune hepatitis, autoimmune inner ear disease, autoimmune lymphoproliferative syndrome, autoimmune peripheral neuropathy, autoimmune pancreatitis, autoimmune polyendocrine syndrome, autoimmune progesterone dermatitis, autoimmune thrombocytopenic purpura, autoimmune urticaria, autoimmune uveitis, Balo concentric sclerosis, Behcet's disease, Berger's disease, Bickerstaff's encephalitis, Blau syndrome, bullous pemphigoid, Castleman's disease, celiac disease, Chagas disease, chronic inflammatory demyelinating polyneuropathy, chronic recurrent multifocal osteomyelitis, chronic obstructive pulmonary disease, Churg-Strauss syndrome, cicatricial pemphigoid, Cogan syndrome, cold agglutinin disease, complement component 2 deficiency, contact dermatitis, cranial arteritis, CREST syndrome, Crohn's disease, Cushing's syndrome, cutaneous leukocytoclastic vasculitis, Dego's disease, Dercum's disease, dermatitis herpetiformis, dermatomyositis, diabetes mellitus type 1, diffuse cutaneous systemic sclerosis, Dressler's syndrome, drug-induced lupus, discoid lupus erythematosus, eczema, endometriosis, enthesitis-related arthritis, eosinophilic fasciitis, eosinophilic gastroenteritis, epidermolysis bullosa acquisita, erythema nodosum, erythroblastosis fetalis, essential mixed cryoglobulinemia, Evan's syndrome, fibrodysplasia ossificans progressive, fibrosing alveolitis, gastritis, gastrointestinal pemphigoid, giant cell arteritis, glomerulonephritis, Goodpasture's syndrome, Grave's disease, Guillain-Barre syndrome, Hashimoto's encephalopathy, Hashimoto's thyroiditis, Henoch-Schonlein purpura, herpes gestationis, hidradenitis suppurativa, Hughes-Stovin syndrome, hypogammaglobulinemia, idiopathic inflammatory demyelinating diseases, idiopathic pulmonary fibrosis, idiopathic thrombocytopenic purpura, IgA nephropathy, inclusion body myositis, chronic inflammatory demyelinating polyneuropathy, interstitial cystitis, juvenile idiopathic arthritis, Kawasaki's disease, Lambert-Eaton myasthenic syndrome, leukocytoclastic vasculitis, lichen planus, lichen sclerosus, linear IgA disease, lupus erythematosus, Majeed syndrome, Meniere's disease, microscopic polyangiitis, mixed connective tissue disease, morphea, Mucha-Habermann disease, myasthenia gravis, myositis, narcolepsy, neuromyelitis optica, neuromyotonia, ocular cicatricial pemphigoid, opsoclonus myoclonus syndrome, Ord's thyroiditis, palindromic rheumatism, PANDAS, paraneoplastic cerebellar degeneration, paroxysmal nocturnal hemoglobinuria, Parry Romberg syndrome, Parsonage-Turner syndrome, pars planitis, pemphigus vulgaris, pernicious anaemia, perivenous encephalomyelitis, POEMS syndrome, polyarteritis *nodosa*, polymyalgia rheumatic, polymyositis, primary biliary cirrhosis, primary sclerosing cholangitis, progressive inflammatory neuropathy, psoriatic arthritis, pyoderma gangrenosum, pure red cell aplasia, Rasmussen's encephalitis, raynaud phenomenon, relapsing polychondritis, Reiter's syndrome, restless leg syndrome, retroperitoneal fibrosis, rheumatic fever, Schnitzler syndrome, scleritis, scleroderma, serum sickness, Sjogren's syndrome, spondyloarthropathy, stiff person syndrome, subacute bacterial endocarditis, Susac's syndrome, Sweet's syndrome, sympathetic ophthalmia, Takayasu's arteritis, temporal arteritis, thrombocytopenia, Tolosa-Hunt syndrome, transverse myelitis, ulcerative colitis, undifferentiated connective tissue disease, undifferentiated spondyloarthropathy, vitiligo, and Wegener's granulomatosis), celiac disease, chronic prostatitis, glomerulonephritis, hypersensitivities, inflammatory bowel diseases, pelvic inflammatory disease, reperfusion injury, rheumatoid arthritis, sarcoidosis, transplant rejection, vasculitis, interstitial cystitis, and osteoarthritis.

In other aspects the invention is a method for treating a cancer, comprising administering to a subject having a cancer a spherical high-density lipoprotein nanoparticle (HDL-NP) comprising: a core and a shell surrounding and attached to the core, wherein the core comprises a lipid conjugated organic core scaffold in an effective amount to treat the cancer.

Other conditions that may be treated using compositions of the invention include cancers. Cancers are generally characterized by unregulated cell growth, formation of malignant tumors, and invasion to nearby parts of the body. Cancers may also spread to more distant parts of the body through the lymphatic system or bloodstream. Cancers may be a result of gene damage due to tobacco use, certain infections, radiation, lack of physical activity, obesity, and/or environmental pollutants. Cancers may also be a result of existing genetic faults within cells to cause diseases due to genetic heredity. Screenings may be used to detect cancers before any noticeable symptoms appear and treatment may be given to those who are at higher risks of developing cancers (e.g., people with a family history of cancers). Examples of screening techniques for cancer include but are not limited to physical examination, blood or urine tests, medical imaging, and/or genetic testing. Non-limiting examples of cancers include: bladder cancer, breast cancer, colon and rectal cancer, endometrial cancer, kidney or renal cell cancer, leukemia, lung cancer, melanoma, Non-Hodgkin lymphoma, pancreatic cancer, prostate cancer, ovarian cancer, stomach cancer, wasting disease, and thyroid cancer.

In some embodiments, that nanostructures described herein are useful for treating a cancer that expresses or overexpresses scavenger receptor class B type I (SR-BI). Non-limiting examples of cancers that express or overexpress SR-BI include human prostate cancer, breast cancer, and renal cell carcinoma. Additional non-limiting examples of cancers and cancer cell lines that overexpress SR-BI are listed in Rajora et al. Front Pharmacol. (2016) 7:326. As described herein, the term "overexpression" or "increased expression," refers to an increased level of expression of a given gene product in a given cell, cell type or cell state, as compared to a reference cell, for example, a non-cancer cell or a cancer cell that does not overexpress SR-BI. In some embodiments the cancer cell expresses any level of SR-BI.

The nanostructures are also useful for treating and preventing autoimmune disease or disorder. Autoimmune disease or disorder is a class of diseases in which an subject's own antibodies react with host tissue or in which immune effector T cells are autoreactive to endogenous self peptides and cause destruction of tissue. Thus, an immune response is mounted against a subject's own antigens, referred to as self antigens. Autoimmune diseases or disorders include, but are not limited to, rheumatoid arthritis, Crohn's disease, multiple sclerosis, systemic lupus erythematosus (SLE), autoimmune encephalomyelitis, myasthenia gravis (MG), Hashimoto's thyroiditis, Goodpasture's syndrome, pemphigus (e.g., pemphigus vulgaris), Grave's disease, autoimmune hemolytic anemia, autoimmune thrombocytopenic purpura, scleroderma with anti-collagen antibodies, mixed connective tissue disease, polymyositis, pernicious anemia, idiopathic Addison's disease, autoimmune-associated infertility, glomerulonephritis (e.g., crescentic glomerulonephritis, proliferative glomerulonephritis), bullous pemphigoid, Sjögren's syndrome, insulin resistance, and autoimmune diabetes mellitus.

The compositions containing an effective amount can be administered for prophylactic or therapeutic treatments. In prophylactic applications, compositions can be administered to a patient with a clinically determined predisposition or increased susceptibility to development of a disorder associated with elevated levels of cholesterol, cardiovascular diseases, hyperproliferative diseases (e.g., cancer), inflammatory diseases, dyslipidemia, and other pathological conditions associated with cholesterol. Compositions of the invention can be administered to the patient (e.g., a human) in an amount sufficient to delay, reduce, or preferably prevent the onset of the clinical disease. In therapeutic applications, compositions are administered to a patient (e.g., a human) already suffering from a cardiovascular disease, hyperproliferative diseases (e.g., cancer), an inflammatory disease, and other pathological conditions associated with cholesterol, in an amount sufficient to cure or at least partially arrest the symptoms of the condition and its complications. An amount adequate to accomplish this purpose is defined as a "therapeutically effective dose," an amount of a compound sufficient to substantially improve some symptom associated with a disease or a medical condition. A therapeutically effective amount of an agent or composition is not required to cure a disease or condition but will provide a treatment for a disease or condition such that the onset of the disease or condition is delayed, hindered, or prevented, or the disease or condition symptoms are ameliorated, or the term of the disease or condition is changed or, for example, is less severe or recovery is accelerated in an individual.

In an aspect, the disclosure relates to a method of reducing NF-kB activity, comprising administering to a subject an effective amount of a composition comprising any of the spherical HDL-NP of the instant disclosure.

As used herein, a "subject" or a "patient" refers to any mammal (e.g., a human). Examples of subjects or patients include a human, a non-human primate, a cow, a horse, a pig, a sheep, a goat, a dog, a cat or a rodent such as a mouse, a rat, a hamster, or a guinea pig. Generally, the invention is directed toward use with humans.

In some embodiments, the HDL-like nanoparticles of the present disclosure are in a pharmaceutical compositions. These "pharmaceutical compositions" or "pharmaceutically acceptable" compositions may comprise a therapeutically effective amount of one or more of the structures described herein, formulated together with one or more pharmaceutically acceptable carriers, additives, and/or diluents. The pharmaceutical compositions described herein may be useful for treating sepsis or other related diseases. It should be understood that any suitable structures described herein can be used in such pharmaceutical compositions, including those described in connection with the figures.

The pharmaceutical compositions may be specially formulated for administration in solid or liquid form, including those adapted for the following: oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream or foam; sublingually; ocularly; transdermally; or nasally, pulmonary and to other mucosal surfaces.

The phrase "pharmaceutically acceptable" is employed herein to refer to those structures, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically-acceptable carrier" as used herein means a pharmaceutically-acceptable material, composition or vehicle, such as a liquid or solid filler, diluent, excipient, or solvent encapsulating material, involved in carrying or transporting the subject compound from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically-acceptable antioxidants include: water soluble antioxidants, such as ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, alpha-tocopherol, and the like; and metal chelating agents, such as citric acid, ethylenediamine tetraacetic acid (EDTA), sorbitol, tartaric acid, phosphoric acid, and the like.

The structures described herein may be orally administered, parenterally administered, subcutaneously administered, and/or intravenously administered. In certain embodiments, a structure or pharmaceutical preparation is administered orally. In other embodiments, the structure or pharmaceutical preparation is administered intravenously. Alternative routes of administration include sublingual, intramuscular, and transdermal administrations.

In an aspect, the disclosure relates to a method for making a spherical high-density lipoprotein nanoparticle (HDL-NP) comprising, preparing a ssDNA-phospholipid conjugate (ssDNA-PL), preparing a tetrahedral small molecule-DNA hybrid (SMDH$_4$), wherein the ssDNA-PL and SMDH$_4$ have complementary DNA sequences, incubating the ssDNA-PL and SMDH$_4$ such that the complementary DNA sequences bases pair with one another to form a DNA-PL core, and adding to the DNA-PL core phospholipid liposomes and apolipoprotein to produce the spherical HDL-NP.

In some embodiments, the ssDNA-PL comprises an oligonucleotide of at least 9 nucleotides. In some embodiments, the oligonucleotide is 6-16 nucleotides in length. In some embodiments, the oligonucleotide comprises SEQ ID NO: 1. In some embodiments, the oligonucleotide is 18 nucleotides in length. In some embodiments, the oligonucleotide comprises SEQ ID NO: 2.

In some embodiments, the SMDH$_4$ comprises an oligonucleotide of at least 9 nucleotides. In some embodiments, the oligonucleotide is 9-15 nucleotides in length. In some embodiments, the oligonucleotide comprises SEQ ID NO: 3. In some embodiments, the oligonucleotide is 18 nucleotides in length. In some embodiments, the oligonucleotide comprises SEQ ID NO: 4.

In some embodiments, the apolipoprotein of any of the methods disclosed herein is apolipoprotein A-I.

Without further elaboration, it is believed that one skilled in the art can, based on the above description, utilize the present invention to its fullest extent. The following specific embodiments are, therefore, to be construed as merely illustrative, and not limitative of the remainder of the disclosure in any way whatsoever. All publications cited herein are incorporated by reference for the purposes or subject matter referenced herein.

EXAMPLES

As described elsewhere herein, DNA-PL$_4$ cores were synthesized in a two-step fashion (see Synthesis section herein). First, DNA-phospholipid conjugates (ssDNA-PL), and tetrahedral small molecule-DNA hybrids (SMDH$_4$), were synthesized (Table 2). Second, ssDNA-PL and SMDH$_4$ with complementary base-paired sequences were hybridized to yield the final DNA-PL$_4$ cores (FIG. 2B and FIGS. 6-9).

Figure 2C:
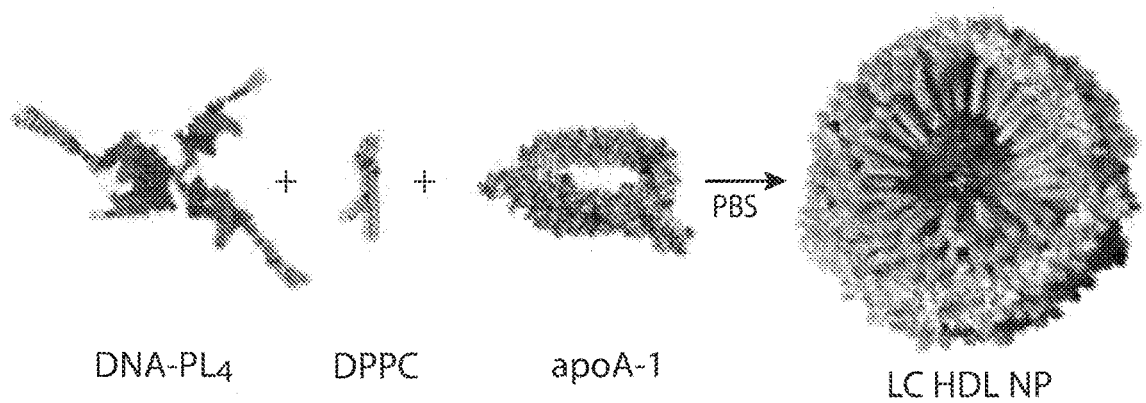

Using the resulting core scaffolds, the assembly of LC HDL NPs was performed and optimized. Liposomes were prepared from 1,2-dipalmitoyl phosphatidyl choline (DPPC) by re-suspending a thin film (1 mM DPPC) in phosphate-buffered saline (PBS: 10 mM Na2HPO4 and 137 mM NaCl; pH=7.4), followed by sonication. PL$_4$ core scaffolds were then prepared as thin films, while improved aqueous solubility enabled beginning with DNA-PL$_4$ core scaffolds already in aqueous buffer. The other NP components were then added to the core scaffolds: first, DPPC liposomes, and second, apoA-1, each pre-suspended in PBS. The mixture was subjected to three rounds of sonication, allowed to relax on ice, and then filtered and concentrated using a 50 kDa MWCO spin column, with alternating benchtop centrifugation to remove aggregates (FIG. 2C).

Figure 2D:
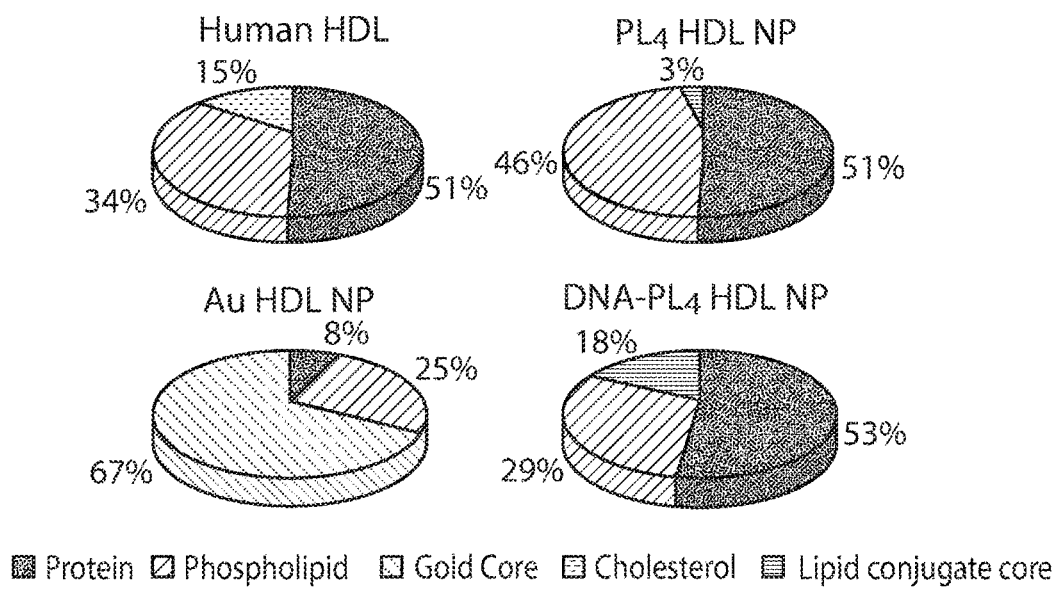
Figure 2E:
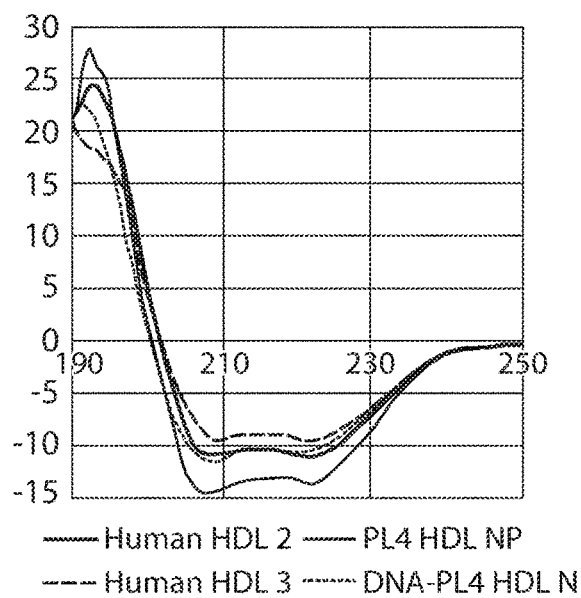
Figure 2F:
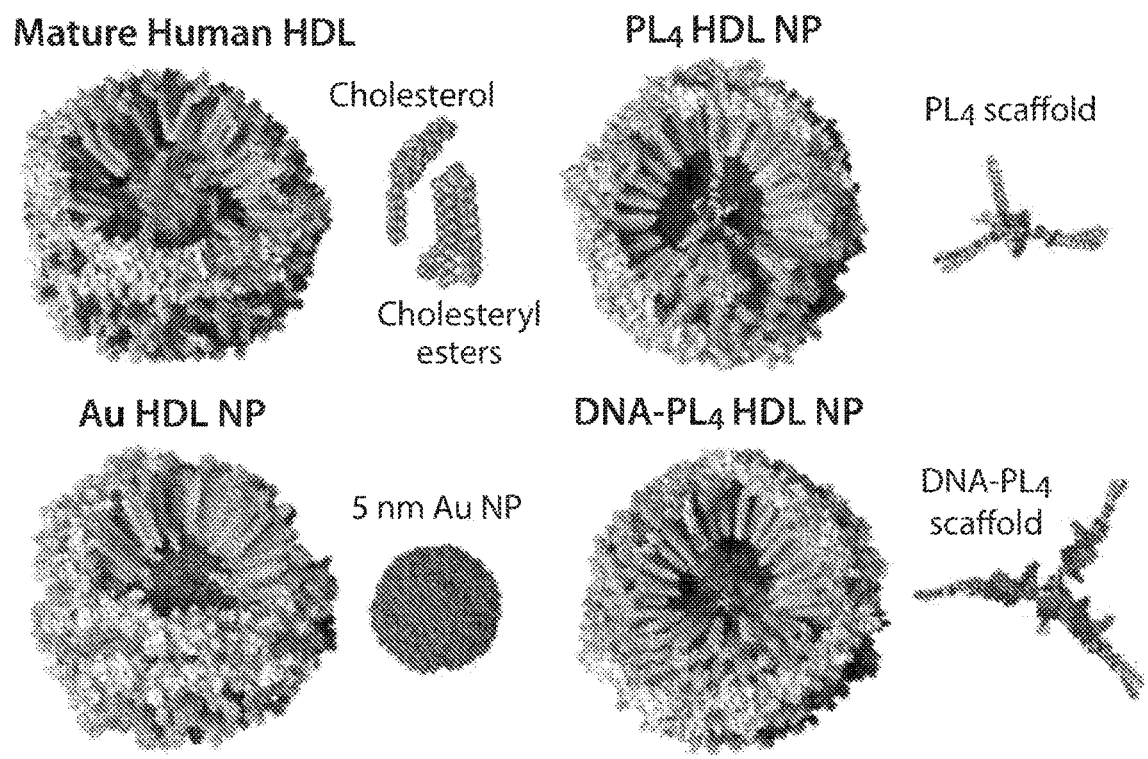
Figure 2G:
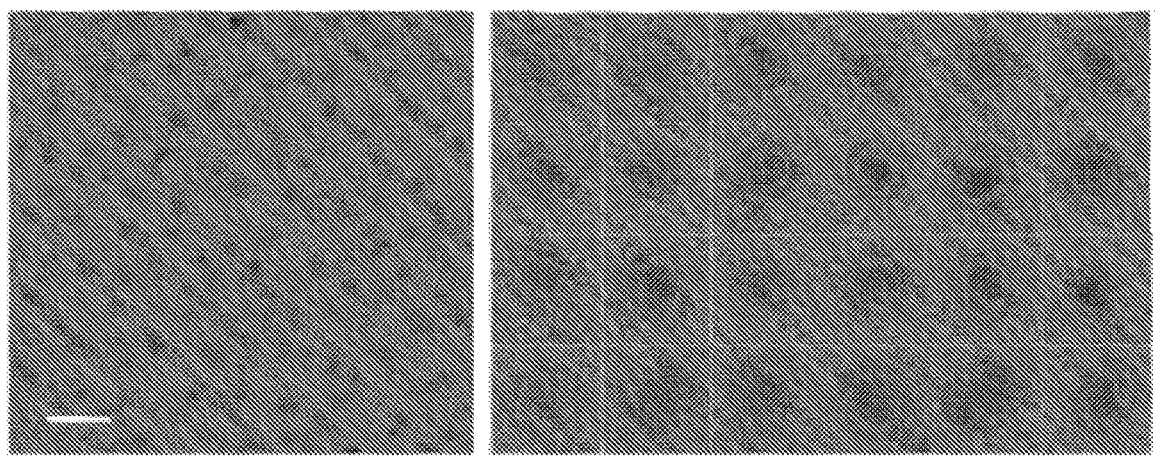
Figure 2G:
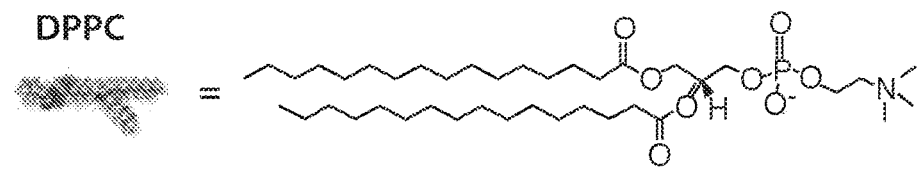
Figure 2G:
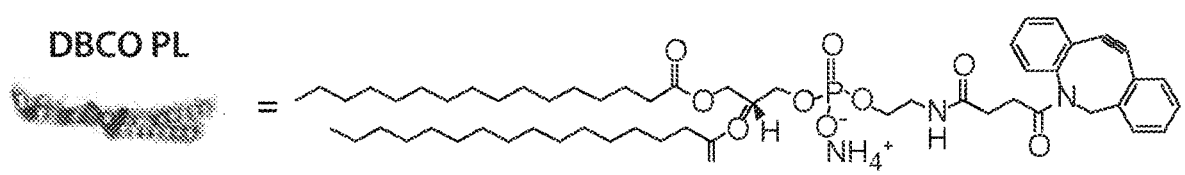
Figure 2G:
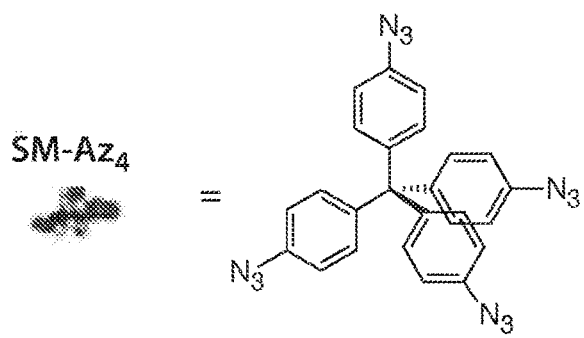
Figure 13:
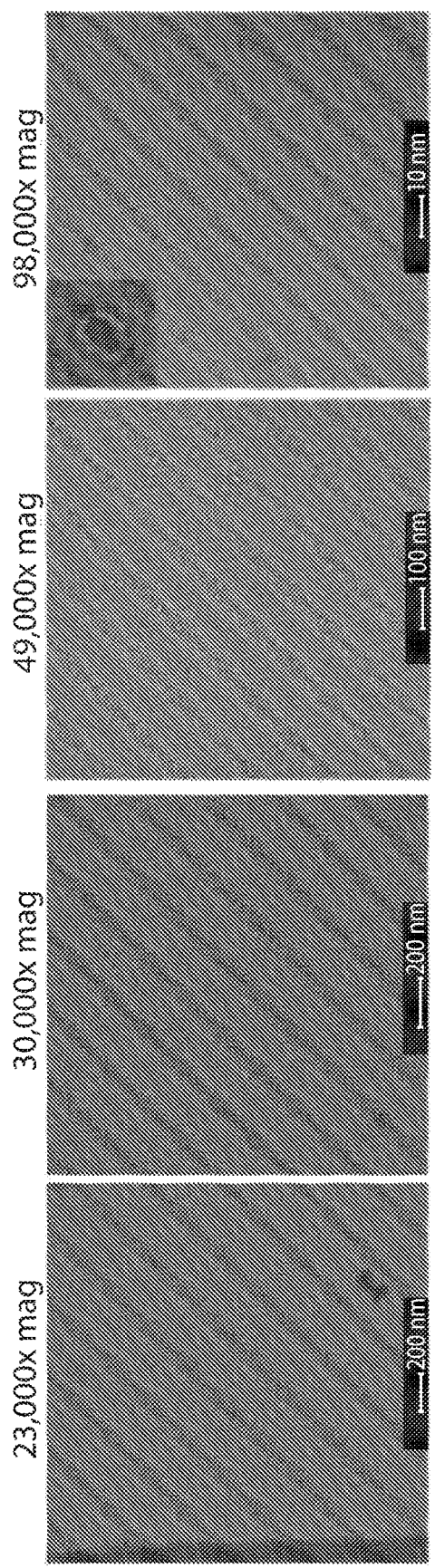
FIG. 13 shows an ultrastructural characterization of PL$_4$ HDL NPs via negative stain TEM. Imaging was performed with FEI Tecnai Spirit TEM. Inset (far right panel) is under 120,000× magnification. Scale bars labeled on each image, from 50-200 nm. TEM diameter was determined to be 10±2 nm by measurement of >50 particles using ImageJ software.
Figure 14:
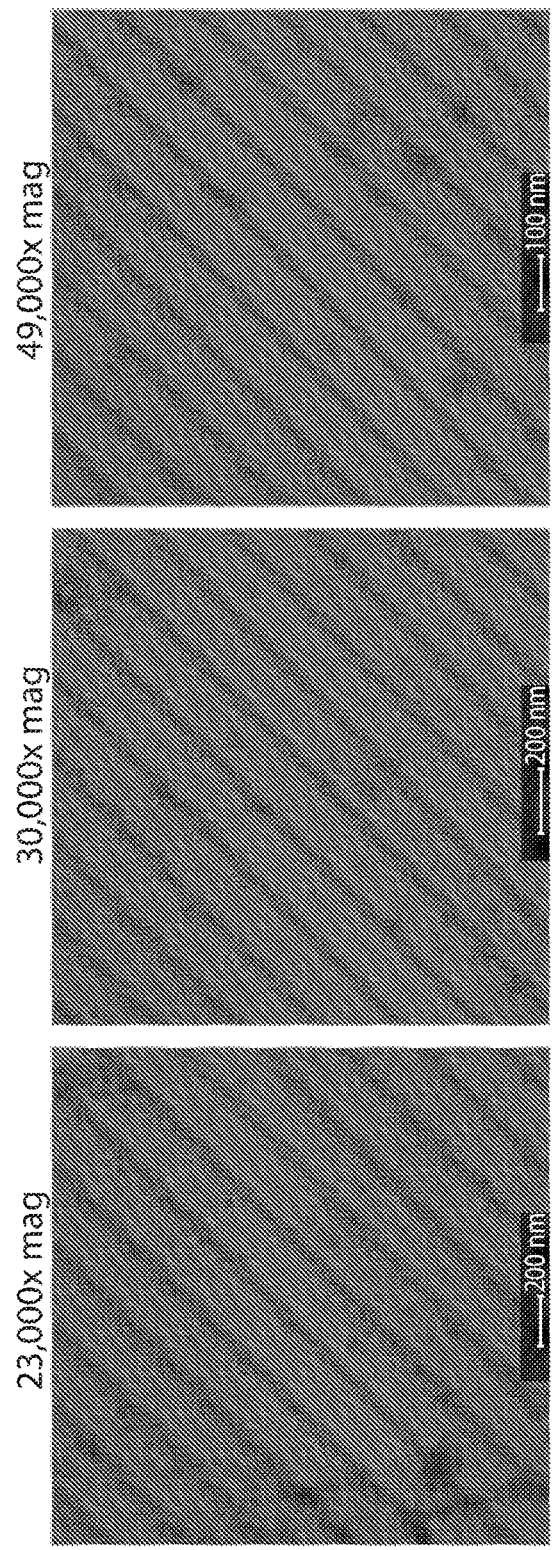
FIG. 14 shows an ultrastructural characterization of assembly attempt using 18-mer DNA-PL$_4$ scaffolds.
Figure 15:
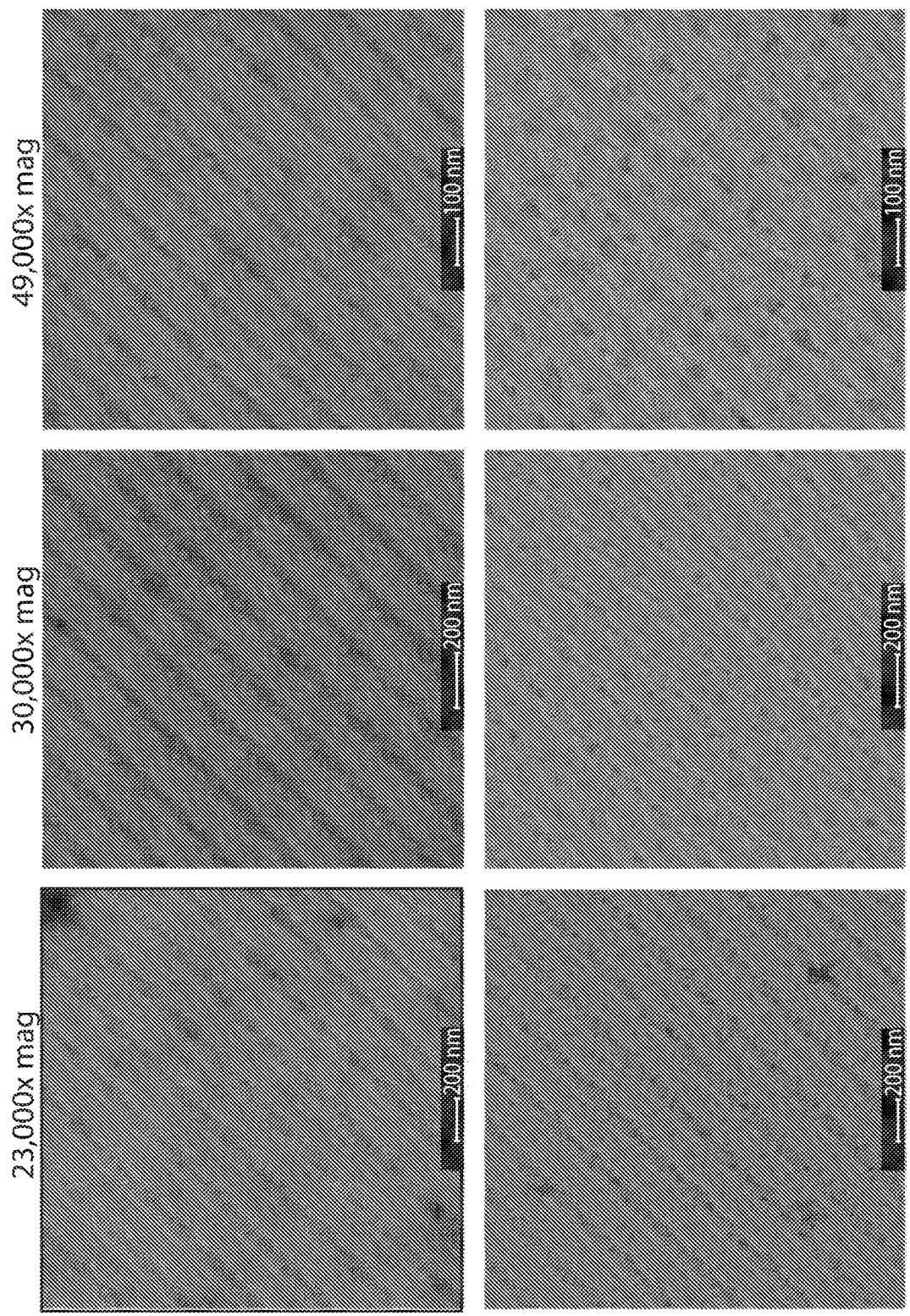
FIG. 15 shows TEM imaging of Core+DPPC, w/o apoA-1 (top row: DNA-PL$_4$ core+DPPC; bottom row: PL$_4$ core+DPPC). Note: adequate visualization of Core+DPPC control samples without protein required uranyl acetate staining for longer time period (15 min stain) compared to protein-containing samples (20 s stains).

Ultra-structurally, highly monodisperse nanoparticles were observed by transmission electron microscope (TEM) for particle assemblies using $PL_4$ and 9-DNA-$PL_4$ scaffolds ($PL_4$ HDL NP diameter: 10±2 nm, 9-DNA-$PL_4$ HDL NP diameter: 9±2 nm) (FIG. 2G and FIG. 13). Notably, the morphology of the particles was not characteristic of immature discoidal HDLs, or rHDLs, both of which exhibit a hallmark rouleaux formation of stacked phospholipid discs.[17, 22-23] Instead, the particles appeared roughly spherical, with a peripheral annular hypodense region. Dynamic light scattering experiments revealed hydrodynamic diameters resembling those of human HDLs (DH=13.8±3.9 and 13.3±4.6 nm for $PL_4$ HDL NPs and 9-DNA-$PL_4$ HDL NPs, respectively) (Table 3). Size-exclusion chromatography (SEC) demonstrated peak retention volumes of 8.22 and 8.58-8.88 mL for 9-DNA-$PL_4$ HDL NPs and $PL_4$ HDL NPs, respectively. SEC traces of LC HDL NPs also revealed right-sided tails consistent with a small amount of free apoA-I (10.13 mL retention volume), which was also observed in human HDL controls. While $PL_4$ and 9-DNA-$PL_4$ scaffolds successfully generated sub-20 nm particles, the assemblies using 18-DNA-$PL_4$ scaffolds persisted as large vesicular structures after the addition of DPPC and apoA-1 (FIG. 13). Herein, it was hypothesized that this is a result of the hybrid's size being prohibitively large for apoA-1 assembly. Interestingly, 9-DNA-$PL_4$ HDL NPs were not significantly larger than $PL_4$ HDL NPs. This result, in conjunction with the lack of assembly using 18-DNA-$PL_4$, suggests that LC HDL NP particle size may be determined primarily by apoA-1 protein folding, irrespective of core size below a given threshold. Because LC HDL NPs were achieved using 9-DNA-$PL_4$ but not 18-DNA-$PL_4$, all figures and remaining text refer to the particles formed using 9-DNA-$PL_4$ scaffolds simply as DNA-$PL_4$ HDL NPs.

Figure 16:
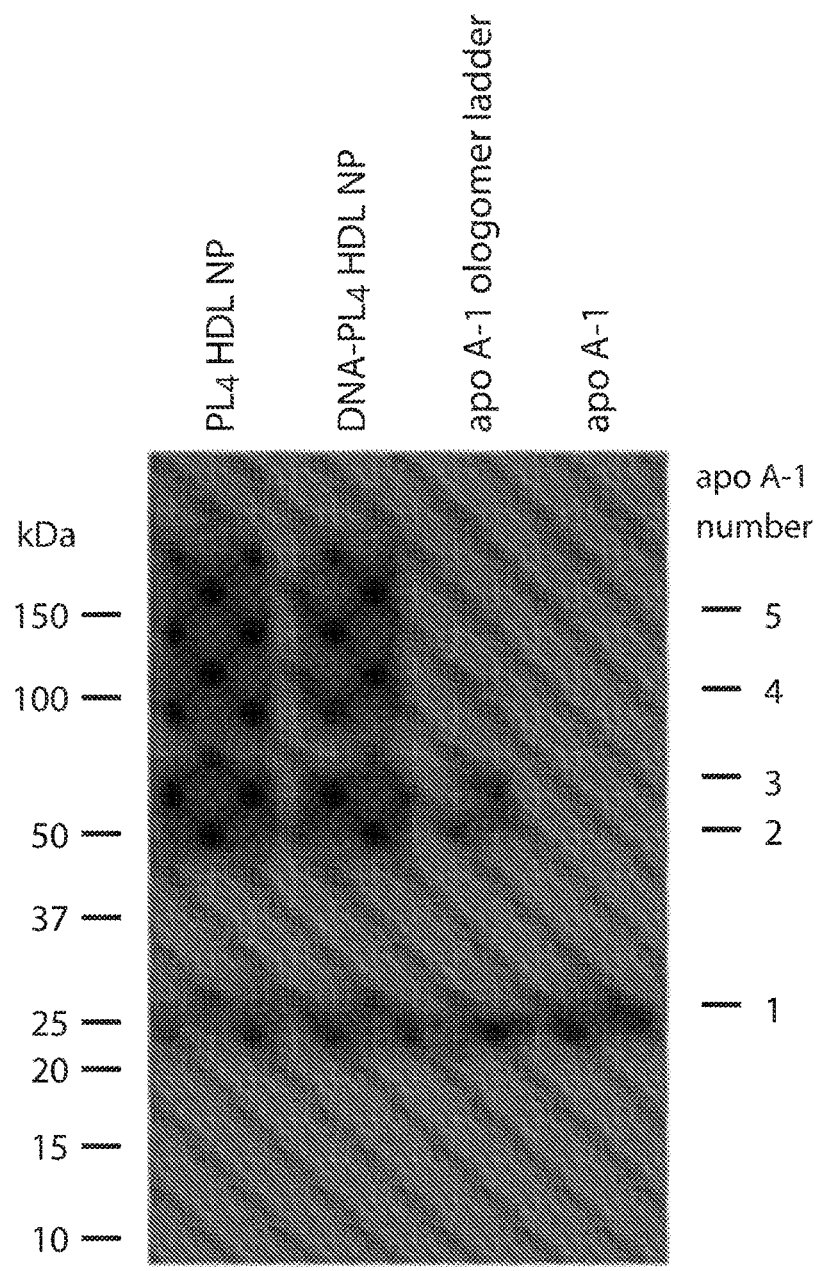
FIG. 16 Characterization of LC HDL NP assembly and apoA-1 oligomerization profiles. apoA-1 adopts higher order oligomerization states upon assembly with lipid conjugate core scaffolds for both PL$_4$ and DNA-PL$_4$ particles.

To characterize LC HDL NP structure in terms of apoA-1 protein conformation, circular dichroism was performed on LC HDL NPs, apoA-1, $HDL_2$ and $HDL_3$ isolated from human serum, and inorganic template HDL-like nanoparticles (Au HDL NPs). Analysis of secondary structure was conducted using three distinct reference protein databases. Surprisingly, $PL_4$ HDL NPs and DNA-$PL_4$ HDL NPs were found to closely resemble human HDLs in secondary structure, while Au HDL NPs by contrast, exhibited excess alpha helicity and substantially less beta sheet and turn content (Table 1) (FIG. 2E). To further characterize LC HDL NP structure, the oligomerization state of apoA-1 was investigated by cross-linking LC HDL NPs with bissulfosuccinimidyl suberate followed by immunoblot.[18] ApoA-1 interaction with LC cores was found to induce stable oligomer formation (FIG. 16). Moreover, the surface zeta potential of LC HDL NPs was more negative ($PL_4$: −21±2 mV, DNA-$PL_4$: −19±1 mV) than apoA-1 alone (−10±3 mV) or apoA-1 and DPPC without the core scaffold (−12±2 mV), but consistent with human $HDL_2$ (−19±2 mV) and $HDL_3$ (−21±5 mV). These results are consistent with oligomerization, as apoA-1 oligomers are highly negatively charged. Finally, the composition of LC HDL NPs was determined and compared them to those of Au HDL NPs and human HDLs. LC HDL NPs were found to closely mirror $HDL_2$ and $HDL_3$ with respect to the relative mass contributions of each component, with the exception that LC HDL NPs do not contain cholesterol or cholesteryl esters (FIG. 2D; Table 4).

Figure 3C:
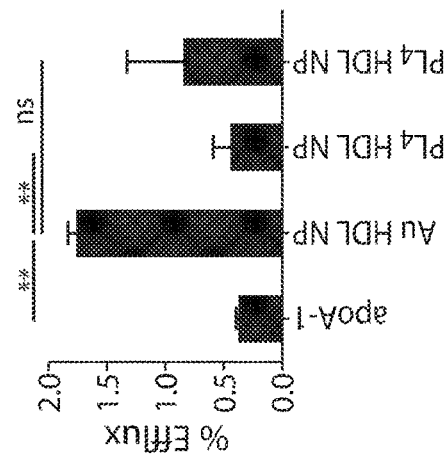
FIGS. 3A-3D FIG. 3A shows LC HDL NPs efflux H$^3$-chol from cAMP-treated J774 macrophages.
Figure 3D:
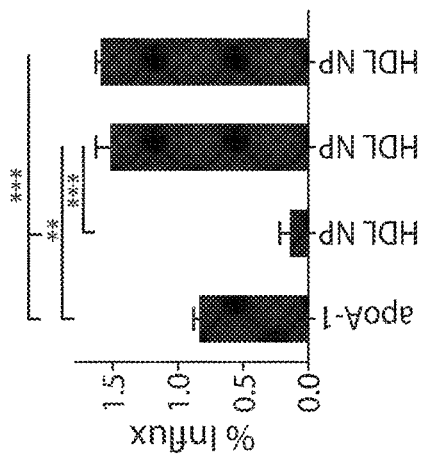
Figure 3A:
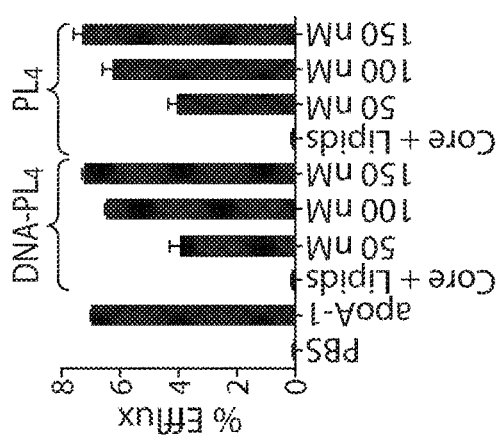

Complementary biological assays were performed to investigate whether LC HDL NPs could recapitulate salient HDL functions. A critical property for HDL mimicry is the ability to efflux cholesterol from lipid-laden macrophages. Efflux efficiency of LC HDL NPs was examined using an in vitro radiolabeled cholesterol efflux assay (see Oligomerization Assay section).[24] Briefly, J774 macrophages were loaded with tritium-labeled cholesterol ($H^3$-chol), cultured with cAMP to upregulate cholesterol efflux receptors, and then treated with nanoparticles or controls for 4 hours. The media supernatant was subjected to liquid scintillation counting to quantify percent effluxed $H^3$-chol. Both $PL_4$ HDL NPs and DNA-$PL_4$ HDL NPs facilitated robust cholesterol efflux ($PL_4$: 6.2±0.7%, DNA-$PL_4$: 6.5±0.2%; 100 nM protein) in a dose-dependent fashion, while control groups with core scaffolds and lipids alone exhibited minimal capacity for efflux (FIG. 3A).

Figure 4A:
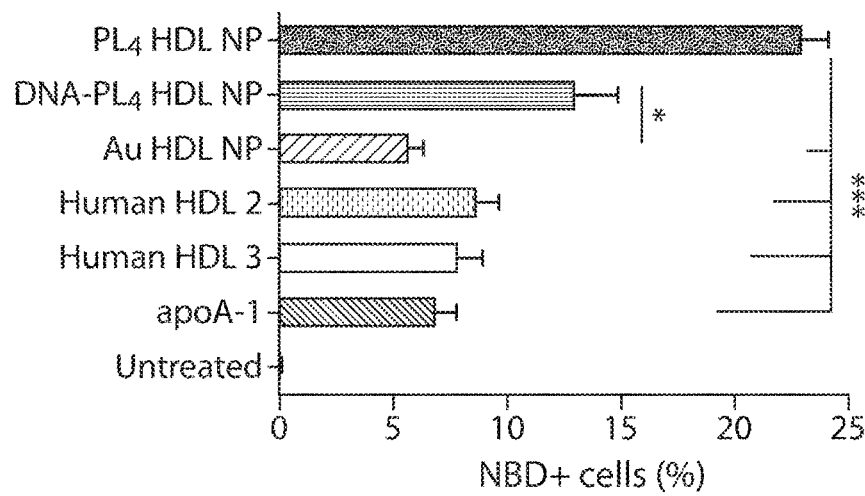
FIG. 4 LC HDL NPs facilitate rapid delivery of fluorescent cholesterol (NBD-chol) to hepatocytes (HepG2) in 30 min via flow cytometry (FIGS. 4A-4B) and confocal microscopy (FIG. 4C). Statistical significance determined using a two-tailed student's t test. *p<0.05. ***p<0.001.
Figure 4B:
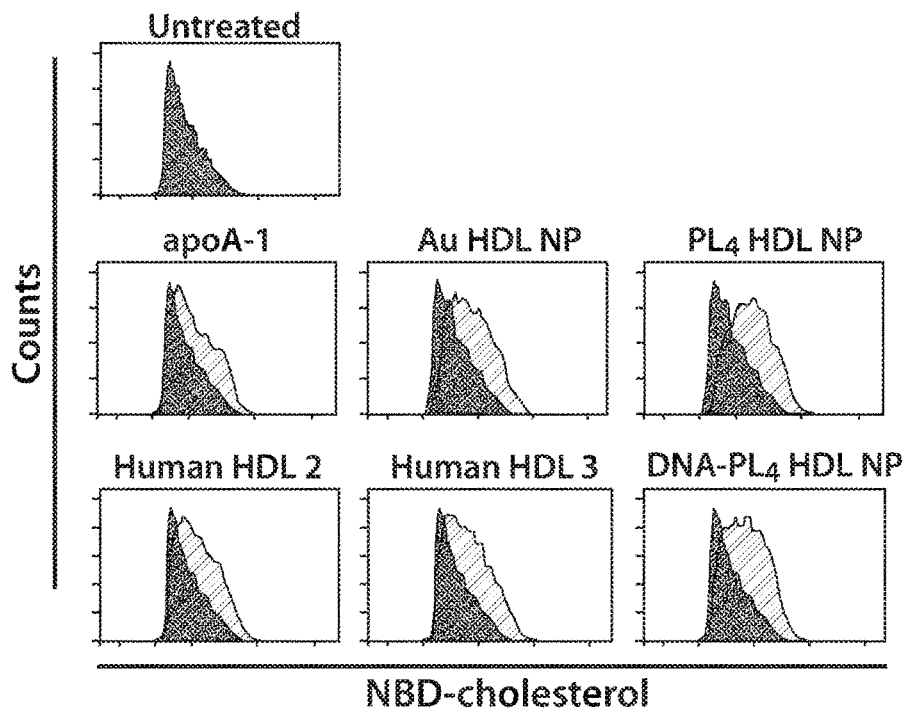
Figure 4C:
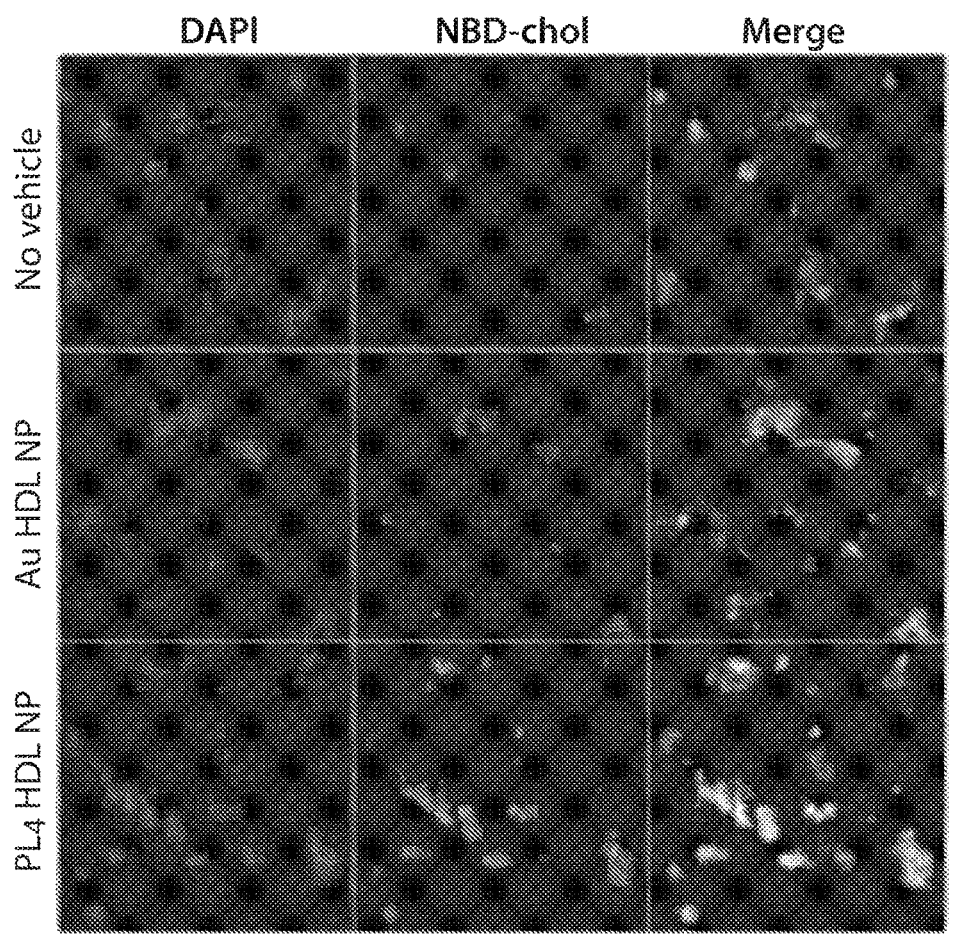

In addition to efflux, cholesterol delivery is a specialized function carried out in the native setting by mature HDLs. To assess the efficacy of LC HDL NPs as cholesterol delivery agents, cultured hepatocytes (HepG2) were co-treated with a fluorescent cholesterol (NBD-chol) and LC HDL NPs or controls, and subsequently processed for flow cytometry or confocal microscopy. LC HDL NPs facilitated efficient delivery of NBD-chol in only 30 min (FIG. 4), with 23% of $PL_4$ HDL NP-treated cells being NBD-positive compared to 5.7% and 6.8% for Au HDL NP and apoA-1 respectively.

Figure 3B:
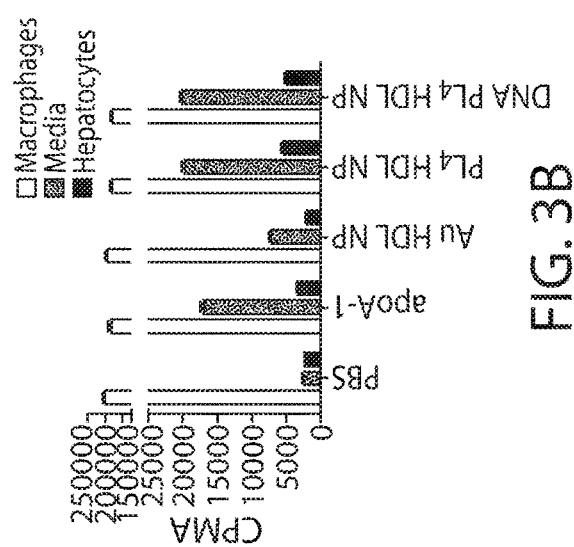

An experiment was then designed to simulate the entire reverse cholesterol transport process in a single assay. This was accomplished by performing the standard radiolabel efflux assay followed by an influx step whereby conditioned efflux media was introduced to HepG2 cells and influx was allowed to proceed for an additional 4 hours. Then liquid scintillation was performed counting on all three fractions from macrophages, hepatocytes, and media supernatant. The results herein (FIGS. 3B-3C) revealed that LC HDL NPs exhibited superior cholesterol transport capacity when compared to both apoA-1 ($p<0.01$) and Au HDL NP (*$p<0.001$) Overall, this assay demonstrates not only that LC HDL NPs are capable of robust cholesterol efflux and delivery, but that a single particle cohort can execute these functions sequentially by on-loading and off-loading cholesterol in a dynamic fashion.

Materials and Instrumentation

Unless otherwise stated, all reagents and reagent-grade solvents were purchased from Sigma-Aldrich (Milwaukee, WI) and used as received. All lipids-1,2-dipalmitoyl-sn-glycero-3-phosphoethanolamine-N-dibenzocyclooctyl (DBCO PE) and 1,2-dipalmitoyl-sn-glycero-3-phosphocholine (DPPC)- and fluorescent cholesterol (22-(N-(7-Nitrobenz-2-Oxa-1,3-Diazol-4-yl)Amino)-23,24-Bisnor-5-Cholen-3β-O1 ((NBD)-cholesterol)),were obtained from Avanti Polar Lipids (Alabaster, AL). ApoA-I protein was obtained from MyBioSource (San Diego, CA). All chemicals were used without further purification. Ultrapure deionized (DI) $H_2O$ (18.2 MΩ·cm resistivity) was obtained from a Millipore system (Milli-Q Biocel). Tetrakis(4-azidophenyl)methane[1] and lipid phosphoramidite[2] were synthesized according to previously published procedures.

The syntheses of hexynyl-functionalized DNA strands and DNA-lipid conjugates were carried out on an Expedite 8909 Nucleic Acid System. DNA products were purified and analyzed on an Agilent 1100 HPLC equipped with reverse-phase (RP) semi-preparative (Dynamax, 250×10 mm, Microsorb 300 Å/10 μm/C18, Agilent #R083213C10) and analytical (Dynamax, 100×4.6 mm, Microsorb 100 Å/3 μm/C18, Agilent #R0080200E3) columns, respectively. The coupling of hexynyl-functionalized DNA with tetrakis(4-azidophenyl)methane was carried out in a Thermomixer R 5355 (Eppendorf AG North America, Hauppauge, NY) instrument. Absorption spectra of DNA materials were recorded on a Varian Cary 300 Bio UV-vis spectrophotometer (Varian, Inc., Palo Alto, CA) using a masked quartz cell (path length=10 mm, catalog #29B-Q-10-MS, Starna cells Inc., Atascadero, CA). Negative stain transmission electron microscopy (TEM) images were acquired using a FEI Tecnai Spirit TEM operating at 120 kV, using 300-mesh carbon-coated copper grids (Electron Microscopy Services). Confocal imaging was carried out with a Nikon A1R Spectral microscope. Flow cytometry was performed using a BD LSRFortessa cell analyzer. Matrix-assisted laser desorption/ionization time-of-flight (MALDI-ToF) mass spectrometric data were collected as negative ions using the linear mode on a Bruker AutoFlex III MALDI-ToF mass spectrometer (Bruker Daltonics, Billerica, MA). The instrument was equipped with Smartbeam™ laser technology operated at 30-40% power with a sampling speed of 10 Hz. One thousand scans were averaged for each mass spectrum. Data from Agilent HPLC and Bruker MALDI-ToF instruments were processed using MestreNova software version 8.1.1-11591.

Synthesis a. Synthesis of DNA-$PL_4$ Cores.

a-1. Synthesis and Purification of 9-$SMDH_4$ and 18-$SMDH_4$

Small molecule-DNA hybrids (SMDHs) with 9 and 18 mer DNA arms (9-$SMDH_4$ (SEQ ID NO: 1) and 18-$SMDH_4$'s (SEQ ID NO: 2), respectively) were synthesized and purified according to a previously published procedure[3] and DNA sequences used in this study are listed in the Table 2. To identify the different products that were formed in the SMDH preparation, an aliquot of the collected sample of crude SMDHs was first analyzed using an analytical RP-HPLC column (see Materials and Instrumentation section herein) and a gradient method beginning with 95:5 v/v 0.1 M TEAA (aq):MeCN (TEAA (aq)=triethylammonium acetate, aqueous solution), and increasing to 60:40 v/v 0.1 M TEAA(aq):MeCN over 35 min (at a ramp of +1 vol % MeCN/min), with a flow rate of 1 mL/min. Then, the whole sample was subjected to purification using a semi-preparative RP-HPLC column (see Materials and Instrumentation section herein) and a gradient method beginning with 95:5 v/v 0.1 M TEAA (aq):MeCN and increasing to 60:40 v/v 0.1 M TEAA(aq):MeCN over 70 min (at a ramp of +0.5 vol % MeCN/min, a slower gradient was employed here to ensure adequate separation of the peaks), with a flow rate of 3 mL/min. The identity of the collected $SMDH_4$ product was confirmed by MALDI-ToF MS analysis (insets in FIGS. 6-7) and its purity was reassessed using analytical RP-HPLC (FIGS. 6-7) with the aforementioned analytical RP-HPLC solvent program.

a-2. Solid-Phase Synthesis and Purification of DNA-Phospholipid Conjugates

Figure 9:
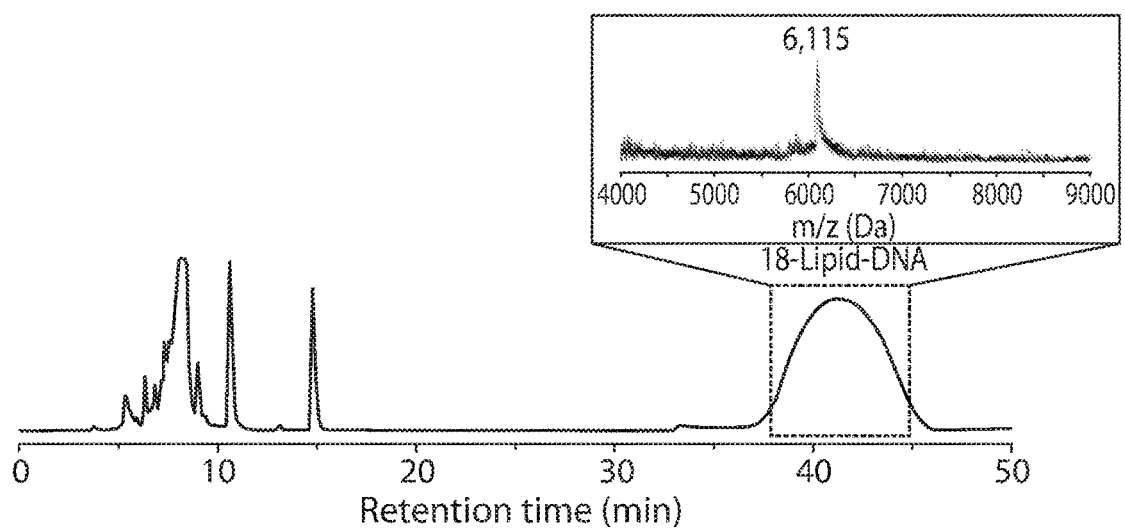
FIG. 9 shows a semi-preparative RP-HPLC trace of crude 18-DNA-lipid (SEQ ID NO: 4). The trace is the signal from the diode detector set at 260 nm. The pure 18-DNA-lipid (SEQ ID NO: 4) at 38-45 min was isolated and identified by MALDI-ToF (Inset): m/z=6,115 (6,118.2 theoretical).
Figure 10:
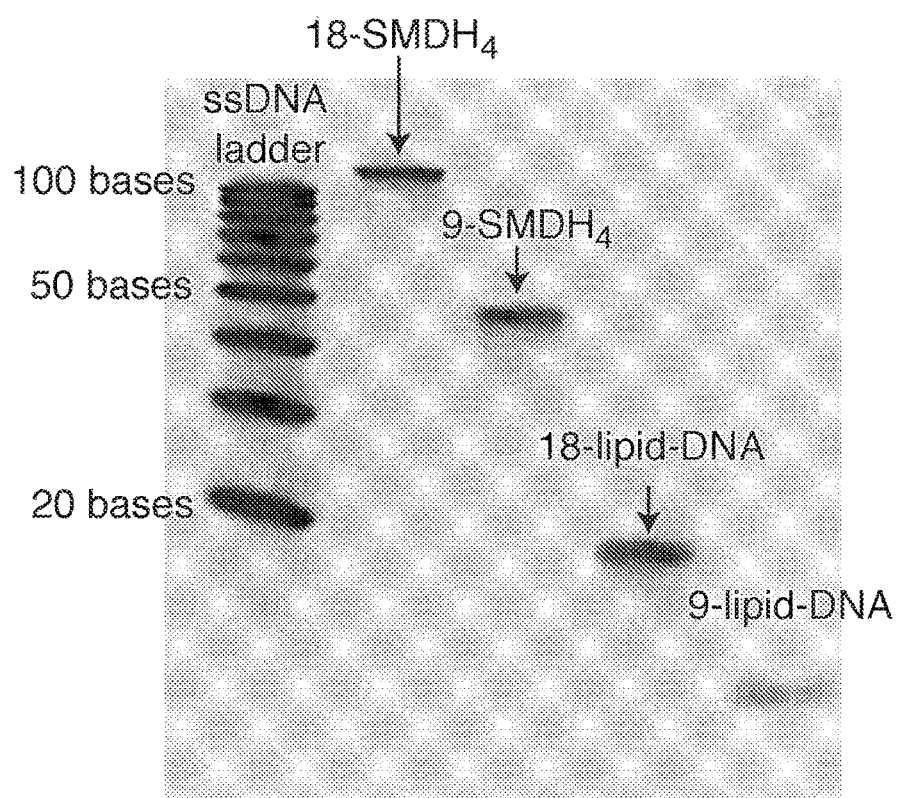
FIG. 10 shows a denaturing PAGE-gel image (15%, 7 M Urea) of 9-SMDH$_4$ (SEQ ID NO: 1) and 18-SMDH$_4$'s (SEQ ID NO: 2) and 9-DNA-lipid (SEQ ID NO: 3) conjugate and 18-DNA-lipid (SEQ ID NO: 4) conjugate. The gel experiment was carried out in 1×TBE buffer at 180 V for 1 h and then the gels were stained with SYBR Gold (Thermo Fisher Scientific, Inc., Grand Island, NY) and their pictures were taken using a Typhoon 9400 (GE Healthcare, Pittsburgh, PA).

Syntheses were carried out from the 3' direction using controlled pore glass (CPG) beads possessing 1 μmol of either adenine (Glen Research, dA-CPG #20-2001-10, (1000 Å, 28 μmol/g)) or thymine (Glen Research, dT-CPG #20-2031-10 (1000 Å, 27 μmol/g)) attached to the surface. The CPG beads were placed in a 1 μmol synthesis column and 3'-phosphoramidites (Glen Research, dA-CE phosphoramidite #10-1000-05, Ac-dC-CE phosphoramidite #10-1015-05, dmf-dG-CE phosphoramidite #10-1029-05, dT-CE phosphoramidite #10-1030-05) were then added using the standard 1 μmol protocol on an Expedite 8909 synthesizer to make the CPG-3'-ssDNA (see Table 2 for sequences). A lipid phosphoramidite was added to the 5' end of ssDNA strand and then the beads were dried with a stream of dried nitrogen gas and placed in a vial containing aqueous fresh AMA solution (1 mL of a 1:1 v/v mixture of 30 wt % aqueous ammonium hydroxide solution and 40 wt % aqueous methylamine solution). The vial was then capped and heated at 65° C. for 15 min to cleave DNA-lipid conjugates from the solid supports. The ammonia and methyl amine byproducts were then removed by passing a stream of dry nitrogen gas over the content of the vial until the characteristic ammonia smell disappears. The remaining liquid, which contains the crude DNA-lipid conjugates, was collected by pipette and the remaining beads were further extracted with ultrapure deionized water (200 μL). The extract was combined with the initial solution of crude DNA-lipid conjugates (affording a total volume of 0.4 mL at the end) and filtered through a 0.45 μm nylon syringe filter (Acrodisc® 13 mm syringe filter #PN 4426T). The collected sample of crude product was subjected to purification using analytical RP-HPLC (FIGS. 8-9) and a gradient method beginning with 95:5 v/v 0.1 M TEAA (aq):MeCN (TEAA (aq)=triethylammonium acetate, aqueous solution), and increasing to 100% MeCN over 50 min (at a ramp of +1.9 vol % MeCN/min), with a flow rate of 1 mL/min. The identity of the collected product was confirmed by MALDI-ToF analysis (insets in FIGS. 8-9) and its purity was verified by denaturing polyacrylamide gel electrophoresis (PAGE) (FIG. 9).

a-3. Assembly of DNA-Phospholipid Conjugates and $SMDH_4$

Equimolar mixtures of the as-prepared $SMDH_4$ and its complementary DNA-lipid conjugate in TAMg buffer solution (40 mM Tris, 20 mM acetic acid, and 7.5 mM MgCl2; pH 7.4) were added into 0.5 mL Eppendorf tubes. The resulting solutions were then heated to 90° C. in a heating block (Thermomixer R; Eppendorf, Hauppauge, NY) and kept there for 5 min to remove all initial DNA interactions. The power to the heating block was then turned off to allow the solution to slowly cool to rt over 3 h (for a typical cooling profile of this equipment, please see figure S16 in the supplementary information for Yildirim, I.; Eryazici, I.; Nguyen, S. T.; Schatz, G. C. *J. Phys. Chem. B* 2014, 118, 2366-2376).

b. Synthesis of $PL_4$ Core.

b-1. Synthesis of Tetrakis(4-Azidophenyl)Methane

Tetrakis(4-azidophenyl)methane was synthesized according to a previously published procedure[1].

b-2. Conjugation of DBCO PE and Tetrakis(4-Azidophenyl) Methane $PL_4$ core materials were synthesized by copper-free click chemistry conjugation of 1,2-dipalmitoyl-sn-glycero-3-phosphoethanolamine-N-dibenzocyclooctyl (DBCO PE) with a tetrahedral small molecule core (tetrakis(4-azidophenyl)methane) (FIG. 11). In a typical click chemistry reaction, the DBCO PE and tetrakis(4-azidophenyl)methane were each dissolved at 0.1 wt % in N,N-dimethylformamide (DMF) (Sigma Aldrich) and mixed at a 10:1 molar ratio of DBCO PE to tetrakis(4-azidophenyl)methane in DMF. The reaction mixture was subjected to three rounds of alternating vortexing and bath sonication, and was then allowed to react at room temperature under vortex for 24 h. Electrospray ionization mass spectrometry was then used to characterize the resulting products (FIG. 12).

c. LC HDL NP Assembly

Nanoparticle assembly was carried out by first preparing 1,2-dipalmitoyl-sn-glycero-3-phosphocholine (DPPC) liposomes. DPPC was dissolved at 0.1 wt % in chloroform in 5 mL glass vials. A thin film was then generated by evaporating the solvent with N2 gas. The film was further dried under reduced pressure in a desiccator for >2 h. Liposomes were then generated by resuspending the thin film in phosphate-buffered saline (PBS: 10 mM phosphate and 137 mM NaCl, pH=7.4) at a DPPC concentration of 1 mM with alternating bath sonication and vortexing. For $PL_4$ HDL NPs, the $PL_4$ core scaffold was prepared by generating a thin film from a 0.1 wt % solution in DMF, in the same manner described above for DPPC. For DNA-$PL_4$ HDL NPs, the core scaffolds began in TAMg buffer solution (40 mM Tris, 20 mM acetic acid, and 7.5 mM MgCl2; pH=7.4) due to the improved water solubility of the core imparted by the oligonucleotides. To initiate particle assembly, the non-scaffold nanoparticle components were then added sequentially to the core scaffolds. In a typical assembly, 40 nmol of DPPC was added to 2 nmol lipid conjugate core scaffold (either $PL_4$ or DNA-$PL_4$), followed by addition of 4 nmol of apoA-1, with both DPPC and apoA-1 being pre-suspended in PBS. The suspensions were then diluted in PBS to a final core concentration of 10 uM in PBS. The suspensions were subjected to three rounds of alternating bath sonication (90 s ON, 30 s OFF) and vortexing, and were allowed to relax on ice for >30 min. The particles were then filtered and concentrated using 0.5 mL 50 kDa MWCO spin columns (MilliPore). The columns were first rinsed in PBS for 10 min at 10,000×g at 4° C., prior to three rounds of spin filtration of the particles under the same conditions. 500 ul of PBS were added to the column after each spin, such that the solvent of each particle suspension was PBS after spin filtration, with TAMg buffer removed from solution for the DNA-$PL_4$ HDL NPs. After each round of filtration, the particles were centrifuged by desktop centrifugation to remove any aggregates. After the final round of filtration, the small volume of concentrated particles (~20 uL) was diluted to 100-200 ul in PBS and the protein concentration was determined by bicinchoninic acid assay (BCA), with spectroscopic measurement of absorbance at 562 nm after incubation with BCA reagents at 37° C. for 30 min. The particles were then either used immediately or placed at 4° C. for short-term storage.

d. Preparation of Controls for TEM

Control samples were prepared to investigate the LC HDL NPs assembly process, and its dependence on the lipid conjugated core scaffold and apoA-1. Core+scaffold w/o apoA-1 controls were prepared by making DPPC liposomes as described above (see Synthesis section herein). DPPC liposomes were then added to core scaffolds at the same concentration and molar ratio as in LC HDL NPs, with $PL_4$ scaffolds thin filmed and DNA-$PL_4$ scaffolds in aqueous buffer (PBS). The mixtures were then subjected to three rounds of alternating sonication and vortexing, and were filtered and concentrated through 50 kDa MWCO spin columns as above. apoA-1 and DPPC alone controls were assembled in an identical manner without core scaffolds.

Negative Stain Transmission Electron Microscopy

For grid preparation, samples were prepared at a concentration of 1-2 μM protein in PBS, dropcast on UV-treated carbon-coated copper 300-mesh grids (Electron Microscopy Services) and air dried in a chemical fume hood. The grids were washed twice with PBS, stained twice with 2% uranyl acetate for 20 sec, then washed three times with PBS and air dried prior to imaging. Imaging was conducted using a FEI Tecnai Spirit TEM operating at 80 kV.

Circular Dichroism

Circular dichroism was performed using a JASCO J-815 CD spectrometer. All samples were diluted to 75 ug/mL protein in distilled water. Spectra were derived from three accumulations of a single sample. Secondary structure data was acquired using CDPro software package running the analysis algorithm, CONTIN. Three distinct analyses were performed using different soluble protein reference sets. The values reported in Table 1 reflect the mean±SEM results of these three analyses.

Composition Characterization a. Protein quantification. To quantify protein content of nanoparticles and native HDL, we used a commercially available bicinchoninic acid (BCA) assay (Thermo Fisher) per the manufacturer's instructions. Briefly, we generated a protein standard curve by diluting bovine serum albumin (BSA) samples from 0.125-2 mg/mL into a final volume of 80 μl per well in 96-well plates using BCA reagent solution. Nanoparticle samples were diluted in the same manner; standards and samples were diluted by a factor of 40. Standards were plated in duplicate and samples were plated in triplicate. Plates were incubated for 30 min at 37° C. and then absorbance at 562 nm was measured using a Synergy plate reader.

b. Phospholipid quantification. Phospholipid content of nanoparticles and native HDL was quantified using a colorimetric Phospholipid Assay Kit (Sigma-Aldrich) per the manufacturer's instructions. Briefly, a phospholipid standard curve was prepared from 15 μM to 200 μM via serial dilution. Samples were serially diluted in PBS to obtain one or more dilutions within the range of the standard curve. Samples and standards were then incubated with the enzyme reaction mixture for 30 min at rt and then absorbance at 572 nm was determined using a Synergy plate reader.

c. Cholesterol, Cholesteryl ester, and Core quantifications. Cholesterol and cholesteryl ester concentrations were determined using an Amplex Red Cholesterol Assay (ThermoFisher) per the manufacturer's instructions. Briefly, cholesterol standard curves were prepared in kit-provided aqueous buffer from 8 ug/mL to 125 ng/mL. Two sets of samples were prepared in triplicate and diluted into 1× Reaction Buffer. Two reaction mixtures were then prepared containing hydrogen peroxide, resorufin, and the enzymes horseradish peroxidase, cholesterol oxidase, with or without cholesterol esterase to enable quantification of both free cholesterol and cholesteryl esters. One set of samples was then incubated with reaction mixture containing cholesterol esterase, and the other set was incubated with reaction mixture without cholesterol esterase. Microplates were then incubated at 37° C. for 1 h or until fluorescent signal began to decline. The core concentration of DNA-$PL_4$ HDL NPs was determined by measuring absorbance at 260 nm via UV-Vis spectroscopy. Because $PL_4$ core concentration could not be determined directly, the core concentration was estimated using the experimentally determined core:protein molar ratio obtained for DNA-$PL_4$ particles. It is worth noting that this approximation assumes the same average copy number of apoA-1 molecules per particle for $PL_4$ HDL NPs and DNA-$PL_4$ HDL NPs, which is likely a close approximation given the similar particle sizes observed by TEM. Composition of Au HDL NPs was reported from previously published work.[4]

Oligomerization Assay.

a. Preparation of cross-linked particle and protein samples. The cross-linking agent bis[sulfosuccinidimidyl] suberate (BS3) (Sigma Aldrich) was used to stabilize any higher order oligomerization states of apoA-1 in LC HDL NPs upon assembly, prior to detection via immunoblot. The method used here was adapted from a previously reported protocol[4]. LC HDL NPs were prepared as described above and diluted to 50 μg/mL protein in PBS. BS3 cross-linking agent was then added to LC HDL NPs for a final BS3 concentration of 2.5 mM, and the reaction was allowed to proceed for 30 min at room temperature. To produce an apoA-1 oligomer ladder, lipid-free pure apoA-1 (MyBioSource) was dialyzed in PBS, and then subjected to cross-linking with BS3 (0.25 mM) at elevated protein concentration (500 m/mL) for 4 h at room temperature. 0.5 M Tris base was used to stop the cross-linking reactions (45 mM final).

b. apoA-1 immunoblot. BioRad apparatuses were used for gel electrophoresis and protein transfer. Pre-cast 4-20% polyacrylamide gels (MiniProtean TGX, BioRad) were used for separation. Protein transfer to polyvinylidine fluoride (PVDF) membrane was performed using Tris-Glycine buffer with 20 vol % methanol. PVDF membrane was then rinsed in TBS and blocked in 5 wt % nonfat dry milk for 1 hour at rt. Primary antibody (rabbit anti-apoAI, Abcam) was added to the membrane at 1:1000 dilution in 5 wt % nonfat dry milk, and incubated at 4° C. overnight. The membrane was then washed in TBS-Tween (0.1%) three times for 10 min each. Secondary antibody (goat anti-rabbit HRP, BioRad) was then added at 1:2000 dilution in 5 wt % nonfat dry milk. The membrane was then washed three times in TBS-Tween for ten minutes each, and then bathed in electrochemiluminescence substrate solution for 1 min, and exposed to autoradiography film for 10-90 sec for optimal exposure duration and developed (FIG. 16).

Radiolabel Assays.

a. Efflux assays: For efflux experiments, we used the gold standard assay in the field, efflux of tritium-labeled cholesterol ($H^3$-chol) from J774 macrophages. J774 macrophages were cultured for at least two passages prior to seeding at 150,000 cells per well in 24 well plates in RPMI, 10% fetal bovine serum (FBS), 1% penicillin-streptomycin (PenStrep) on Day 1. Ethanol stocks of $H^3$-chol were handled under sterile conditions. $H^3$-chol stocks were evaporated, redissolved in 1 mL of ethanol and incubated at 37° C. for 60 min. The solution was then evaporated again and redissolved in 50 μL ethanol and incubated at 37° C. for 30 min. Heat inactivated FBS (Corning, NY) was then added to the $H^3$-chol solution and incubated at 4° C. overnight. On Day 2, serum-free RPMI with 1% PenStep and 2 μg/mL Sandoz (Sigma-Aldrich, St. Louis, MO) was added to the $H^3$-chol-containing FBS to yield a final labeling media of 2 uCi/mL $H^3$-chol, 5 vol % FBS in RPMI. Note that Sandoz is an ACAT inhibitor used to prevent esterification of $H^3$-chol. Media was aspirated from 24 well plates and 500 μL of $H^3$-chol labeling media was added (1 uCi per well). Labeling was allowed to proceed for 24 h. On Day 3, labeling media was removed, cells were washed twice with MEM, 25 μM HEPES, and upregulation media (RPMI, 1% PenStrep, 300 μM cAMP, 2 μg/mL Sandoz, 1% BSA) was added to upregulate the canonical cholesterol efflux receptor ABCA1. (Note: for cAMP(−) efflux assays (FIG. 4D), this media was added without cAMP in order to investigate SR-B1-dependent efflux.) Upregulation was allowed to proceed for 24 h prior to addition of efflux media. Efflux samples containing nanoparticles and controls were prepared in serum-free media (MEM, 25 μM HEPES, 1% PenStrep) to reduce non-specific $H^3$-chol efflux by serum cholesterol carriers. Cells were washed twice in MEM, 25 μM HEPES and efflux media was added to each well according to the treatment regimen. Efflux was allowed to proceed for 4 h. Efflux media was then removed, vacuum filtered, and added to 3 mL UltimaGold scintillation fluid for scintillation counting. A separate triplicate cohort of $H^3$-chol-loaded macrophages were washed, air dried, and incubated at room temperature in isopropanol to extract $H^3$-chol as a measure of total cholesterol at t=0 at the beginning of efflux. A PBS treated control cohort was used as a baseline, and the counts obtained for these samples were then subtracted from experimental groups to obtain baseline-corrected counts. Efflux percentages were then calculated as ratios of baseline-corrected counts for efflux media to counts for t=0 macrophages, indicating the fraction of $H^3$-chol which was removed from cells over the course of 4 h treatment not due to diffusion alone.

b. Tandem efflux-influx assays: For efflux-influx experiments, efflux was conducted identically as above. Hepatocytes (HepG2 cells) were plated at 100,000 cells/well in DMEM, 10% FBS, 1% PenStrep in 24 well plates on Day 3. On Day 4, immediately after 4 h of efflux, HepG2 cells were washed twice in serum-free MEM, 25 μM HEPES, and then efflux media from J774 macrophages was removed and added directly to HepG2 cells. Influx was allowed to proceed for 4 h prior to harvesting. Influx media supernatant was then collected and processed identically as efflux media described above. $H^3$-chol was then extracted from HepG2 cells by incubating in 500 μL isopropanol for 4 hours at rt, sealed in Parafilm. $H^3$-chol-containing isopropanol was then collected, evaporated, and redissolved in xylene prior to addition to UltimaGold for scintillation counting.

NBD-Cholesterol Delivery Experiments a. Confocal microscopy. HepG2 cells were cultured in Dulbecco's Modified Eagle's Medium (DMEM) containing 10% FBS and 1% PenStrep. One day prior to treatment, cells were plated at 100,000 cells/well in 24 well plates on top of glass coverslips. On the day of treatment, cells were washed three times with PBS and fresh media containing 5 ug/mL NBD-cholesterol was then added to each to each well with or without a delivery agent according to treatment regimen. Uptake was allowed to proceed for 30 min when the cells were fixed and prepared for confocal microscopy. Cells were fixed in 4% PFA for 10 min at rt. Cells were then washed three times in PBS, stained with DAPI (300 nM in PBS) for 5 min, and washed two more times in PBS. Coverslips were then mounted on glass slides using Fluoromount G mounting media, and allowed to seal at rt for at least 24 h prior to imaging. Confocal microscopy was performed using a Nikon A1R Spectral, and image processing was conducted with Nikon Elements and Fiji software.

b. Flow cytometry. HepG2 cells were plated at 200,000 cells/well in 24-well plates one day prior to treatment. On the day of treatment, cells were washed three times with PBS and fresh media containing 5 ug/mL NBD-cholesterol was then added to each to each well with or without a delivery agent according to treatment regimen. Uptake was allowed to proceed for 30 min prior to harvesting. Cells were then trypsinized, neutralized in serum-containing media, and centrifuged at 300×g for 6 min to pellet the cells. Cells were resuspended in PBS containing 2% bovine serum albumin (BSA) and then subjected to flow cytometry using a BD LSRFortessa cell analyzer (BD Biosciences). Analysis was performed using FlowJo software. Events were gated to exclude cellular debris and aggregates prior to quantification of NBD-chol positivity.

Lecithin Cholesterol Acyl Transferase (LCAT) Activity Assays

LC HDL NPs and Au HDL NPs (250 nM) suspended in PBS were incubated with LCAT (10 nM) and free cholesterol (100 μg/mL) in PBS at 37° C. for 15 h in a ThermoMixer shaking at 300 rpm. Samples were then centrifuged three times at 10,000 g for 10 min through a 50 kDa spin column to remove excess unbound cholesterol. Samples were then diluted 100 times in 1× Reaction Buffer prior to quantification with Amplex Red Cholesterol Assay (Thermo Fisher).

Amplex Red Cholesterol Assay was performed per manufacturer's instructions. Briefly, a cholesterol standard curve was prepared by serially diluting cholesterol in kit-provided aqueous buffer from 8 ug/mL to 125 ng/mL and adding 50 ul to a 96-well black-bottom microplate. 50 μl of sample were also added to each well of the microplate in triplicate. Two sets of Amplex Red reaction mix were prepared, with and without cholesterol esterase. 50 μl of Amplex Red reaction mix were then added to each well. Microplates were incubated at 37° C. for 1 h or until fluorescent signal began to decline.

NF-kB Activity Assays

For NF-kB activity experiments, THP1-Dual cells were used in conjunction with a QUANTI-Blue secreted embryonic alkaline phosphatase (SEAP) detection kit (Invivogen). THP1-Dual cells were cultured in suspension in RPMI with 10% FBS and passaged at least twice prior to use in experiments. THP1-Dual cells were plated at 100,000 cells per well in 96 well plates. Lipopolysaccharide (LPS) (5 ng/mL) was used to stimulate NF-kB activity. Experimental wells were treated with LPS 1 h prior to addition of nanoparticles or controls. Cells were then incubated with particles or controls for 24 h prior to detection. QUANTI-Blue solution was prepared by dissolving the contents of the packet in endotoxin-free water and incubating at 37° C. for 30 min. QUANTI-Blue solution (180 μL) was added to each well in 96-well plates. THP1-Dual cells supernatant (20 μL) was then added to QUANTI-Blue solution, and the plate was incubated at 37° C. for 2-4 h. SEAP levels were the quantified by detecting absorbance at 650 nm using a Synergy plate reader.

TABLE 1

Structural Analysis of Native and Synthetic HDLs via Circular Dichroism

|  | α-helix (%) | β-sheet (%) | Turn (%) | Unordered (%) |
|---|---|---|---|---|
| apoA-1 | 57 ± 3 | 4 ± 2 | 14 ± 3 | 25 ± 5 |
| Au HDL NP | 73 ± 1 | 0 ± 0 | 6 ± 1 | 21 ± 2 |
| HDL$_2$ | 50 ± 2 | 7 ± 1 | 18 ± 4 | 24 ± 2 |

TABLE 1-continued

Structural Analysis of Native and Synthetic HDLs via Circular Dichroism

|  | α-helix (%) | β-sheet (%) | Turn (%) | Unordered (%) |
|---|---|---|---|---|
| HDL$_3$ | 42 ± 1 | 15 ± 1 | 15 ± 1 | 28 ± 3 |
| PL$_4$ HDL NP | 50 ± 1 | 7 ± 1 | 16 ± 5 | 27 ± 1 |
| DNA-PL$_4$ HDL NP | 40 ± 1 | 20 ± 2 | 16 ± 2 | 25 ± 7 |

TABLE 2

List of DNA Sequences of SMDH$_4$ DNA Arms and DNA-Lipid Conjugates

| DNA Length | DNA Sequences* | SEQ ID NO: |
|---|---|---|
| 9-SMDH$_4$ | 3'-TCG GCT GGA-small molecule | 1 |
| 18-SMDH$_4$ | 3'-TTG CTG AGT ATA ATT GTT-small molecule | 2 |
| 9-DNA-lipid | 3'-TCC AGC CGA-lipid | 3 |
| 18-DNA-lipid | 3'-AAC AAT TAT ACT CAG CAA-lipid | 4 |

*DNA sequences of SMDH$_4$ DNA arms are complementary to those of DNA-lipid conjugates (i.e., 9-SMDH$_4$ (SEQ ID NO: 1) to 9-DNA-lipid (SEQ ID NO: 3) and 18-SMDH$_4$ (SEQ ID NO: 2) to 18-DNA-lipid (SEQ ID NO: 4)).

TABLE 3

Dynamic Ligh Scattering Results for LC HDL NPs and Controls

| Sample | Hydrodynamic Diameter (nm) |
|---|---|
| Free apoA-I | 7.6 ± 0.2 |
| Human HDL$_2$ | 14.1 ± 5.0 |
| Human HDL$_3$ | 13.6 ± 6.1 |
| PL$_4$ HDL NP | 13.8 ± 3.9 |
| DNA-PL$_4$ HDL NP | 13.3 ± 4.6 |

TABLE 4

Composition of LC HDL NPs

| Sample | apoA-I/core scaffold (mol/mol) | DPPC/core scaffold (mol/mol) | DPPC/apoA-I (mol/mol) |
|---|---|---|---|
| PL$_4$ HDL NP | — | 89* | 35 |
| DNA-PL$_4$ HDL NP | 2.56 | 54 | 21 |

*calculated using the protein/core scaffold ratio experimentally determined for DNA-PL$_4$ HDL NPs.

TABLE 5

Molar Composition of Native HDLs

|  | apoA-I | Sphingomyelins | Phosphatidyl Choline | Free Cholesterol | Cholesterol Esters | Triglycerides | Lyso-PC |
|---|---|---|---|---|---|---|---|
| Copy # | 2 | 19 | 109 | 50 | 90 | 19 | 10 |

REFERENCES

1. Roth, G. A.; Huffman, M. D.; Moran, A. E.; Feigin, V.; Mensah, G. A.; Naghavi, M.; Murray, C. J., Global and regional patterns in cardiovascular mortality from 1990 to 2013. *Circulation* 2015, 132 (17), 1667-78.
2. Shepard, D.; VanderZanden, A.; Moran, A.; Naghavi, M.; Murray, C.; Roth, G., Ischemic Heart Disease Worldwide, 1990 to 2013: Estimates From the Global Burden of Disease Study 2013. *Circ Cardiovasc Qual Outcomes* 2015, 8 (4), 455-6.
3. Feig, J. E.; Rong, J. X.; Shamir, R.; Sanson, M.; Vengrenyuk, Y.; Liu, J.; Rayner, K.; Moore, K.; Garabedian, M.; Fisher, E. A., HDL promotes rapid atherosclerosis regression in mice and alters inflammatory properties of plaque monocyte-derived cells. *Proceedings of the National Academy of Sciences of the United States of America* 2011, 108 (17), 7166-71.
4. Yvan-Charvet, L.; Wang, N.; Tall, A. R., Role of HDL, ABCA1, and ABCG1 transporters in cholesterol efflux and immune responses. *Arterioscler Thromb Vasc Biol* 2010, 30 (2), 139-43.
5. Lacko, A. G.; Sabnis, N. A.; Nagarajan, B.; McConathy, W. J., HDL as a drug and nucleic acid delivery vehicle. *Front Pharmacol* 2015, 6, 247.
6. Rosenson, R. S.; Brewer, H. B., Jr.; Chapman, M. J.; Fazio, S.; Hussain, M. M.; Kontush, A.; Krauss, R. M.; Otvos, J. D.; Remaley, A. T.; Schaefer, E. J., HDL measures, particle heterogeneity, proposed nomenclature, and relation to atherosclerotic cardiovascular events. *Clin Chem* 2011, 57 (3), 392-410.
7. Kontush, A.; Chapman, M. J., Functionally defective high-density lipoprotein: a new therapeutic target at the crossroads of dyslipidemia, inflammation, and atherosclerosis. *Pharmacol Rev* 2006, 58 (3), 342-74.
8. Simonsen, J. B., Evaluation of reconstituted high-density lipoprotein (rHDL) as a drug delivery platform—a detailed survey of rHDL particles ranging from biophysical properties to clinical implications. *Nanomedicine* 2016, 12 (7), 2161-2179.
9. Cao, Y. N.; Xu, L.; Han, Y. C.; Wang, Y. N.; Liu, G.; Qi, R., Recombinant high-density lipoproteins and their use in cardiovascular diseases. *Drug Discov Today* 2017, 22 (1), 180-185.
10. Andrews, J.; Janssan, A.; Nguyen, T.; Pisaniello, A. D.; Scherer, D. J.; Kastelein, J. J.; Merkely, B.; Nissen, S. E.; Ray, K.; Schwartz, G. G.; Worthley, S. G.; Keyserling, C.; Dasseux, J. L.; Butters, J.; Girardi, J.; Miller, R.; Nicholls, S. J., Effect of serial infusions of reconstituted high-density lipoprotein (CER-001) on coronary atherosclerosis: rationale and design of the CARAT study. *Cardiovasc Diagn Ther* 2017, 7 (1), 45-51.
11. Kataoka, Y.; Andrews, J.; Duong, M.; Nguyen, T.; Schwarz, N.; Fendler, J.; Puri, R.; Butters, J.; Keyserling, C.; Paolini, J. F.; Dasseux, J. L.; Nicholls, S. J., Regression of coronary atherosclerosis with infusions of the high-density lipoprotein mimetic CER-001 in patients with more extensive plaque burden. *Cardiovasc Diagn Ther* 2017, 7 (3), 252-263.
12. Keyserling, C. H.; Barbaras, R.; Benghozi, R.; Dasseux, J. L., Development of CER-001: Preclinical Dose Selection Through to Phase I Clinical Findings. *Clin Drug Investig* 2017, 37 (5), 483-491.
13. Mendivil, C. O.; Furtado, J.; Morton, A. M.; Wang, L.; Sacks, F. M., Novel Pathways of Apolipoprotein A-I Metabolism in High-Density Lipoprotein of Different Sizes in Humans. *Arterioscler Thromb Vasc Biol* 2016, 36 (1), 156-65.
14. Thaxton, C. S.; Daniel, W. L.; Giljohann, D. A.; Thomas, A. D.; Mirkin, C. A., Templated Spherical High Density Lipoprotein Nanoparticles. 2009.
15. Skajaa, T.; Cormode, D. P.; Falk, E.; Mulder, W. J.; Fisher, E. A.; Fayad, Z. A., High-density lipoprotein-based contrast agents for multimodal imaging of atherosclerosis. *Arterioscler Thromb Vasc Biol* 2010, 30 (2), 169-76.
16. Cormode, D. P.; Skajaa, T.; van Schooneveld, M. M.; Koole, R.; Jarzyna, P.; Lobatto, M. E.; Calcagno, C.; Barazza, A.; Gordon, R. E.; Zanzonico, P.; Fisher, E. A.; Fayad, Z. A.; Mulder, W. J., Nanocrystal core high-density lipoproteins: a multimodality contrast agent platform. *Nano Lett* 2008, 8 (11), 3715-23.
17. Forte, T. M.; Nordhausen, R. W., Electron microscopy of negatively stained lipoproteins. *Methods Enzymol* 1986, 128, 442-57.
18. Luthi, A. J.; Lyssenko, N. N.; Quach, D.; McMahon, K. M.; Millar, J. S.; Vickers, K. C.; Rader, D. J.; Phillips, M. C.; Mirkin, C. A.; Thaxton, C. S., Robust passive and active efflux of cellular cholesterol to a designer functional mimic of high density lipoprotein. *Journal of lipid research* 2015, 56 (5), 972-85.
19. Plebanek, M. P.; Mutharasan, R. K.; Volpert, O.; Matov, A.; Gatlin, J. C.; Thaxton, C. S., Nanoparticle Targeting and Cholesterol Flux Through Scavenger Receptor Type B-1 Inhibits Cellular Exosome Uptake. *Scientific reports* 2015, 5, 15724.
20. Cormode, D. P.; Roessl, E.; Thran, A.; Skajaa, T.; Gordon, R. E.; Schlomka, J. P.; Fuster, V.; Fisher, E. A.; Mulder, W. J.; Proksa, R.; Fayad, Z. A., Atherosclerotic plaque composition: analysis with multicolor CT and targeted gold nanoparticles. *Radiology* 2010, 256 (3), 774-82.
21. McMahon, K. M.; Mutharasan, R. K.; Tripathy, S.; Veliceasa, D.; Bobeica, M.; Shumaker, D. K.; Luthi, A. J.; Helfand, B. T.; Ardehali, H.; Mirkin, C. A.; Volpert, O.; Thaxton, C. S., Biomimetic High Density Lipoprotein Nanoparticles For Nucleic Acid Delivery. 2011.
22. Zhao, Y.; Imura, T.; Leman, L. J.; Curtiss, L. K.; Maryanoff, B. E.; Ghadiri, M. R., Mimicry of high-density lipoprotein: functional peptide-lipid nanoparticles based on multivalent peptide constructs. *Journal of the American Chemical Society* 2013, 135 (36), 13414-24.
23. Brouillette, C. G.; Jones, J. L.; Ng, T. C.; Kercret, H.; Chung, B. H.; Segrest, J. P., Structural studies of apolipoprotein A-I/phosphatidylcholine recombinants by high-field proton NMR, nondenaturing gradient gel electrophoresis, and electron microscopy. *Biochemistry* 1984, 23 (2), 359-67.
24. Low, H.; Hoang, A.; Sviridov, D., Cholesterol efflux assay. *J Vis Exp* 2012, (61), e3810.
25. Pandey, P.; Farha, O. K.; Spokoyny, A. M.; Mirkin, C. A.; Kanatzidis, M. G.; Hupp, J. T.; Nguyen, S. T., A "click-based" porous organic polymer from tetrahedral building blocks. *J Mater Chem* 2011, 21 (6), 1700-1703.
26. Chan, Y. H.; van Lengerich, B.; Boxer, S. G., Lipid-anchored DNA mediates vesicle fusion as observed by lipid and content mixing. *Biointerphases* 2008, 3 (2), FA17.
27. Hong, B. J.; Eryazici, I.; Bleher, R.; Thaner, R. V.; Mirkin, C. A.; Nguyen, S. T., Directed Assembly of Nucleic Acid-Based Polymeric Nanoparticles from Molecular Tetravalent Cores. *Journal of the American Chemical Society* 2015, 137 (25), 8184-8191.

28. Luthi, A. J.; Lyssenko, N. N.; Quach, D.; McMahon, K. M.; Millar, J. S.; Vickers, K. C.; Rader, D. J.; Phillips, M. C.; Mirkin, C. A.; Thaxton, C. S., Robust passive and active efflux of cellular cholesterol to a designer functional mimic of high density lipoprotein. *Journal of lipid research* 2015, 56 (5), 972-85.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A spherical nanoparticle comprising: a core and a shell surrounding and attached to the core, wherein the core comprises a lipid conjugated organic core scaffold, and wherein the spherical nanoparticle is characterized by a surface zeta potential of −16 to −30 millivolts (mV) and at least one of the following:
  (a) the organic core scaffold comprising a hydrophobic small molecule-phospholipid conjugate ($PL_4$); or
  (b) the organic core scaffold comprising an amphiphilic DNA-linked small molecule-phospholipid conjugate (DNA-$PL_4$).

2. The spherical nanoparticle of claim 1, wherein the shell is a lipid bilayer or monolayer.

3. The spherical nanoparticle of claim 1, wherein the organic core scaffold comprises a hydrophobic small molecule-phospholipid conjugate.

4. The spherical nanoparticle of claim 3, wherein the phospholipid comprises a ring-strained alkyne, 1,2-dipalmitoyl-sn-glycero-3-phosphoethan-olamine-N-dibenzocyclooctyl and/or the phospholipid is coupled to the small molecule with a plurality of terminal functional groups.

5. The spherical nanoparticle of claim 3, wherein the small molecule is tetrakis (4-az-idophenyl) methane.

6. The spherical nanoparticle of claim 4, wherein the plurality of functional groups is 2-6 functional groups and/or wherein the functional groups are terminal azides.

7. The spherical nanoparticle of claim 1, wherein the organic core scaffold comprises an amphiphilic DNA-linked small molecule-phospholipid conjugate.

8. The spherical nanoparticle of claim 7, wherein the DNA is double stranded and/or is 5-17 nucleotides in length.

9. The spherical nanoparticle of claim 8, wherein a first single strand of the double stranded DNA is linked to a phospholipid and forms a ssDNA-phospholipid conjugate (ssDNA-PL) and/or a second strand of the double stranded DNA, complementary to the first strand of the double stranded DNA is linked to a small molecule.

10. The spherical nanoparticle of claim 1, wherein the spherical nanoparticle has a diameter of about 5-30 nm, 5-20 nm, 5-15 nm, 5-10 nm, 8-13 nm, 8-12 nm, 10 nm or 5 mm.

11. The spherical nanoparticle of claim 1, further comprising a protein.

12. The spherical nanoparticle of claim 11, wherein the protein is apolipoprotein.

13. The spherical nanoparticle of claim 1, further comprising a therapeutic agent associated with the nanoparticle.

14. A pharmaceutical composition comprising the spherical nanoparticle of claim 1.

15. A method of reducing NF-kB activity, comprising administering to a subject an effective amount of a composition comprising the spherical nanoparticle of claim 1.

16. A method for making the spherical nanoparticle of claim 1 comprising: preparing a ssDNA-phospholipid conjugate (ssDNA-PL), preparing a tetrahedral small molecule-DNA hybrid ($SMDH_4$), wherein the ssDNA-PL and $SMDH_4$ have complementary DNA sequences, incubating the ssDNA-PL and $SMDH_4$ such that the complementary DNA sequences bases pair with one another to form a DNA-$PL_4$ core, and adding to the DNA-$PL_4$ core, phospholipid liposomes and apolipoprotein to produce the spherical nanoparticle.

17. The method of claim 16, wherein the oligonucleotide comprises SEQ ID NO: 1 or SEQ ID NO: 3.

* * * * *